(12) United States Patent
Naveen et al.

(10) Patent No.: US 10,551,507 B2
(45) Date of Patent: Feb. 4, 2020

(54) SEQUENTIAL CHIP MIXED FREQUENCY CORRELATOR ARRAY SYSTEM

(71) Applicant: Accord Ideation Private Limited, Bengaluru (IN)

(72) Inventors: Gowdayyanadoddi Shivaiah Naveen, Ramanagara (IN); Smitha Shrinivasa Nayak, Mangalore (IN); Varsha Bhupal Bavache, Belagavi (IN)

(73) Assignee: Accord Ideation Private Limited, Bangalore (IN)

( * ) Notice: Subject to any disclaimer, the term of this patent is extended or adjusted under 35 U.S.C. 154(b) by 190 days.

(21) Appl. No.: 15/672,326

(22) Filed: Aug. 9, 2017

(65) Prior Publication Data
US 2018/0356531 A1 Dec. 13, 2018

(30) Foreign Application Priority Data
Jun. 8, 2017 (IN) .............................. 201741020080

(51) Int. Cl.
*G01S 19/37* (2010.01)
*G01S 19/30* (2010.01)

(52) U.S. Cl.
CPC .............. *G01S 19/37* (2013.01); *G01S 19/30* (2013.01)

(58) Field of Classification Search
CPC .................................. G01S 19/37; G01S 19/30
USPC ........................................ 342/357.77, 357.63
See application file for complete search history.

(56) References Cited

U.S. PATENT DOCUMENTS

| | | | |
|---|---|---|---|
| 6,151,353 A | 11/2000 | Harrison et al. | |
| 6,289,048 B1 | 9/2001 | Richards et al. | |
| 7,200,163 B2 | 4/2007 | Goodings | |
| 7,428,259 B2 | 9/2008 | Wang et al. | |
| 7,714,760 B2 | 5/2010 | Petrovic | |
| 7,916,075 B2* | 3/2011 | Chen ...................... | G01S 19/24 342/357.63 |
| 8,238,489 B2 | 8/2012 | Kim et al. | |
| 8,334,804 B2 | 12/2012 | Miller | |
| 8,427,366 B2 | 4/2013 | Ganeshan et al. | |
| 8,437,435 B2 | 5/2013 | Jokltalo | |
| 2010/0295727 A1* | 11/2010 | Duffett-Smith ......... | G01S 19/30 342/357.77 |
| 2011/0241938 A1* | 10/2011 | Srikantiah ............... | G01S 19/30 342/357.77 |

(Continued)

*Primary Examiner* — Bo Fan
(74) *Attorney, Agent, or Firm* — Ashok Tankha

(57) ABSTRACT

A global navigation satellite system (GNSS) receiver including a sequential chip mixed frequency correlator array system (SCMFCAS) is provided. The SCMFCAS includes P signal generators, each receiving N samples of intermediate frequency (IF) data of a GNSS signal. Each signal generator includes a primary mixer, a pseudo random noise code generator, and Q mixed frequency correlators (MFCs). Each MFC generates accumulated correlation components of the N samples of the IF data by processing the N samples of the IF data. Adders and subtractors operably connected to the SCMFCAS are time division multiplexed for generating correlation values of a positive frequency and a negative frequency of the N samples of the IF data by combining the accumulated correlation components. Time division multiplexing the adders and the subtractors across the SCMFCAS and generation of the correlation values reduce logic area of the SCMFCAS, thereby reducing power consumption of the GNSS receiver.

6 Claims, 10 Drawing Sheets

(56) References Cited

U.S. PATENT DOCUMENTS

| | | | |
|---|---|---|---|
| 2012/0026039 A1* | 2/2012 | Ganeshan | G01S 19/33 342/357.73 |
| 2013/0016010 A1* | 1/2013 | Nayyar | G01S 19/30 342/357.69 |
| 2016/0182106 A1 | 6/2016 | Anderson | |

* cited by examiner

| PARAMETER NAME | EXPRESSION | | BIT WIDTHS | |
|---|---|---|---|---|
| | STANDARD CORRELATOR | MIXED FREQUENCY CORRELATOR | STANDARD CORRELATOR | MIXED FREQUENCY CORRELATOR |
| IF DATA INPUT | a, b | a, b | 2 bits, each | 2 bits, each |
| LOCALLY GENERATED CARRIER REFERENCE SIGNAL | c, d | c, d | 2 bits, each | 2 bits, each |
| REAL/IMAGINARY COMPONENTS MIXING (WITHIN THE PRIMARY/COMPLEX MIXER) | ac, bd, ad, bc | ac, bd, bc, ad | 4 bits, each | 4 bits, each |
| ADDER AND SUBTRACTOR IN THE PRIMARY MIXER | (ac − bd) (ad + bc) | - | 5 bits, each | - |
| SECONDARY MIXER/SIMPLE MIXER OUTPUT (CODE) | (ac − bd) * 1-bit code (ad + bc) * 1-bit code | ac*1-bit code bd*1-bit code bc*1-bit code ad*1-bit code | 5 bits 5 bits | 4 bits, each 4 bits, each |
| ACCUMULATOR AND DUMP WIDTH | $I_f, Q_f$ | - | 5 bits + log2(N) | - |
| ACCUMULATOR AND DUMP WIDTH | - | $I_1, I_2, Q_1, Q_2$ | - | 4 bits + log2(N) |
| TIME MULTIPLEXED ADDERS AND SUBTRACTORS | - | $I_{+f}, Q_{+f}, I_{-f}, Q_{-f}$ | - | 5 bits + log2(N) |

FIG. 8

| PRIMITIVE | 2-STANDARD CORRELATORS | MIXED FREQUENCY CORRELATOR | RATE OF OPERATION |
|---|---|---|---|
| REAL/IMAGINARY COMPONENTS MIXING | 8 | 4 | $f_s$ |
| ADDER AND SUBTRACTOR IN PRIMARY MIXER | 4 | 0 | $f_s$ |
| LOCAL CARRIER GENERATOR (32-BIT NCO AND PHASE-TO-AMPLITUDE CONVERTER) | 2 | 1 | $f_{NCO}$ |
| PSEUDO RANDOM NOISE CODE GENERATOR (32-BIT NCO, LINEAR FEEDBACK SHIFT REGISTER BASED CODE GENERATOR WITH TWO POLYNOMIALS) | 2 | 1 | $f_s$ |
| SECONDARY MIXER/SIMPLE MIXER (CODE) | 4 | 4 | $f_s$ |
| ACCUMULATOR AND DUMP UNITS | 4 | 4 (bit width is less by 1) | $f_s$ |
| TIME MULTIPLEXED ADDERS AND SUBTRACTORS | 0 | 4 | $f_s/N$ |

FIG. 9

SEQUENTIAL CHIP MIXED FREQUENCY CORRELATOR ARRAY SYSTEM

CROSS-REFERENCE TO RELATED APPLICATIONS

This application claims priority to and the benefit of the non-provisional patent application titled "Sequential Chip Mixed Frequency Correlator Array System", application number 201741020080, filed in the Indian Patent Office on Jun. 8, 2017. The specification of the above referenced patent application is incorporated herein by reference in its entirety.

BACKGROUND

Global navigation satellite system (GNSS) constellations include, for example, the global positioning system (GPS) constellation, the Globalnaya Navigatsionnaya Sputnikovaya Sistema (GLONASS) constellation, the Galileo constellation, the BeiDou navigation satellite system constellation, the Indian regional navigation satellite system (IRNSS) constellation, the Quasi-Zenith satellite system (QZSS) constellation, and constellations of satellite based augmentation systems (SBAS) in well-defined geostationary orbits. Each satellite in the GNSS constellations continuously broadcasts GNSS signals that contain accurate system time and an orbital position of the corresponding satellite. In general, the GNSS constellations use a channel access method, for example, a code division multiple access (CDMA) technique or a frequency division multiple access (FDMA) technique for broadcasting the GNSS signals. In the CDMA technique, multiple GNSS signals are simultaneously transmitted over a single communication channel, for example, by multiplexing multiple GNSS signals onto the same frequency. Furthermore, in the CDMA technique, each satellite in the GNSS constellations is assigned a pseudo random noise (PRN) code that is used to modulate a broadcasted GNSS signal. For example, the GPS constellation contains three PRN codes comprising, for example, a coarse/acquisition (C/A) code, a military (M code), and a precision (P) code. In the FDMA technique used, for example, by the GLONASS constellation, each satellite is assigned a center frequency that is modulated using a common PRN code to spread power. Furthermore, channel selection of each satellite in the FDMA technique is based on frequency separation.

In a global navigation satellite system (GNSS), a GNSS receiver capable of measuring position, velocity, and accurate time using a GNSS signal comprises an antenna for receiving GNSS signals, a radio frequency front end for downconverting and digitizing GNSS signals received by the antenna, and a GNSS baseband engine for acquiring and tracking the digitized GNSS signals. In a typical GNSS receiver architecture, the major computationally intensive part of the GNSS receiver is the GNSS baseband engine. The GNSS baseband engine comprises multiple correlators that allow the GNSS receiver to achieve high sensitivity to extract and calculate a position for a weak GNSS signal, and an optimal time to first fix, which is a measure of time needed by the GNSS receiver to acquire satellite signals and navigation data, and calculate a position solution, referred to as a "fix". Conventionally, the correlators in the GNSS baseband engine of the GNSS receiver are used during an acquisition and tracking stage of GNSS signal processing. The GNSS receiver assigns one or more correlators for acquiring and tracking each individual GNSS signal. With ever increasing GNSS constellations, there is an increased need for GNSS receivers capable of receiving and processing multiple GNSS signals transmitted by satellites in all the GNSS constellations.

In a conventional multi-frequency global navigation satellite system (GNSS) receiver, each GNSS signal from each satellite is processed independently. The GNSS baseband engine of the multi-frequency GNSS receiver comprises multiple parallel correlators for achieving an optimal time to first fix and high sensitivity. The multi-frequency GNSS receiver assigns one or more correlators for acquiring and tracking each individual GNSS signal and searching a particular frequency and a pseudo random noise (PRN) code delay. For example, in a typical commercial global positioning system (GPS) receiver, a frequency search space ranges from about −10 kilohertz (KHz) to about +10 KHz and searched in steps of about 250 Hertz (Hz). The PRN code delay search space is, for example, about 1023 chips and is searched in steps of about 0.5 chips. Hence, in total, there are 80 frequency bins and 2046 code delay bins to be searched. Since a GNSS signal requires a simultaneous search in both frequency and code, the total search space is, for example, 160,000 bins. Therefore, 160,000 parallel correlators are required to perform a search for a single GPS satellite at a given time. Assigning one or more correlators to acquire and track each individual GNSS signal and search a particular frequency and a PRN code delay increases logic area and power consumption of the GNSS receiver. While conventional GNSS receivers are configured to receive GNSS signals from different GNSS constellations to provide accurate and reliable position, velocity, and time, the tradeoff is the increased size of the GNSS receivers and the power consumption. Hence, there is a need for a multi-frequency GNSS receiver with reduced logic area and power consumption.

A standard correlator comprising a local carrier generator, a complex mixer, a pseudo random noise (PRN) code generator, two simple mixers, and two accumulators is used for processing complex intermediate frequency (IF) data represented as (a+jb) of a single global navigation satellite system (GNSS) signal, where "a" refers to a real part of the complex IF data and "jb" refers to an imaginary part of the complex IF data, and where "j" is an imaginary unit equal to square root of negative one, that is, $j=\sqrt{-1}$. The processing of the complex IF data comprises searching a frequency and a PRN code delay. The local carrier generator generates a complex carrier signal represented as (c+jd), where "c" refers to a real part of the complex carrier signal and "jd" refers to an imaginary part of the complex carrier signal, and where "j" is an imaginary unit equal to square root of negative one, that is, $j=\sqrt{-1}$. A carrier signal is an oscillating signal in the form of a transmitted electromagnetic pulse or wave suitable for modulation by an information bearing signal, for example, the GNSS signal. The complex mixer mixes N samples of incoming complex IF data (a+jb) with a locally generated complex carrier signal (c+jd) for producing inphase ((ac−bd), real valued) components and quadrature phase ((ad+bc), imaginary valued) components. The PRN code generator generates a PRN code bit sequence for a particular satellite. The two simple mixers mix the PRN code bit sequence and the inphase components and the quadrature phase components of the complex mixer output.

The two accumulators of the standard correlator coherently accumulate inphase ($I_f$) and quadrature phase ($Q_f$) correlation components of the N samples of the IF data, dump the accumulated result, and continue accumulation of the $I_f$ and the $Q_f$ correlation components of the next N samples of the IF data. The rate of output of the accumulators is reduced by a factor of N as compared to the input complex IF data sampling rate, $f_s$. The $I_f$ and the $Q_f$ correlation components constitute one carrier frequency and one PRN code bit sequence. Typically, two standard correlators are required to compute correlation values of a positive frequency and a negative frequency for a single GNSS signal. If the incoming complex IF data is to be searched for a negative frequency, while searching for a positive frequency, then two standard correlators are required for searching positive components and negative components of the same frequency bin, where the frequency bin refers to magnitude of the frequency only and not the sign of the frequency, and where one correlator searches for the negative frequency and the other correlator searches for the positive frequency. Both these correlators search the incoming complex IF data for the same PRN code bit sequence for both the positive components and the negative components of the same frequency bin. This doubles the required logic area and increases power consumption of the standard correlator. Hence, there is a need for a single correlator that computes correlation values of a positive frequency and a negative frequency for a single GNSS signal.

A common method for reducing the size and power consumption of a global navigation satellite system (GNSS) receiver is use of an application specific integrated circuit (ASIC) for processing multiple GNSS signals. However, even with the ASIC, many commercial applications are battery operated and require substantially low power consumption with a low cost of the ASIC. The cost of the ASIC is driven by the logic area which in turn is governed by the architecture of the GNSS receiver. The large number of parallel correlators in the GNSS receiver used for achieving an optimal time to first fix and high sensitivity, which are specifications for most battery operated applications, increases the logic area of the GNSS receiver. Increase in the logic area of the GNSS receiver increases the power consumption and cost of the GNSS receiver. Hence, there is need for a method for reducing the logic area of a GNSS receiver and consecutively reducing the power consumption and the cost of the ASIC chipset of the GNSS receiver.

Hence, there is a long felt need for a global navigation satellite system (GNSS) receiver with a sequential chip mixed frequency correlator array system comprising M mixed frequency correlators deployed in a GNSS baseband engine of the GNSS receiver with reduced logic area, reduced power consumption, and reduced cost of the application specific integrated circuit (ASIC) chipset of the GNSS receiver, where each M mixed frequency correlator generates correlation values for a positive frequency and a negative frequency of a single GNSS signal.

SUMMARY OF THE INVENTION

This summary is provided to introduce a selection of concepts in a simplified form that are further disclosed in the detailed description of the invention. This summary is not intended to determine the scope of the claimed subject matter.

The global navigation satellite system (GNSS) receiver disclosed herein addresses the above stated need for a sequential chip mixed frequency correlator array system comprising M mixed frequency correlators deployed in a GNSS baseband engine of the GNSS receiver with reduced logic area, reduced power consumption, and reduced cost of the application specific integrated circuit (ASIC) chipset of the GNSS receiver, where each M mixed frequency correlator generates correlation values for a positive frequency and a negative frequency of a single GNSS signal. The implementation of the GNSS receiver disclosed herein reduces the logic area and power consumption such that life of battery operated GNSS applications increases and facilitates the reduction of cost of the ASIC chipset of the GNSS receiver.

The sequential chip mixed frequency correlator array system of the global navigation satellite system (GNSS) receiver disclosed herein comprises P signal generators deployed in the GNSS baseband engine of the GNSS receiver. Each of the P signal generators comprises a primary mixer, a single pseudo random noise (PRN) code generator, and Q mixed frequency correlators. The primary mixer receives N samples of intermediate frequency (IF) data from a radio frequency down converter of the GNSS receiver and generates inphase components and quadrature phase components of the received N samples of the IF data by mixing the received N samples of the IF data with a carrier reference signal locally generated by a single local carrier generator. The N samples of the IF data correspond to a GNSS signal received by the radio frequency down converter. The PRN code generator generates a PRN code bit sequence corresponding to the received GNSS signal. The Q mixed frequency correlators are operably connected to the primary mixer and to the PRN code generator via a linear feedback shift register. Each of the Q mixed frequency correlators comprises secondary mixers and accumulator and dump units. The secondary mixers are operably connected to the primary mixer for generating discrete correlation components of the received N samples of the IF data by mixing the generated inphase components and the generated quadrature phase components of the received N samples of the IF data with the generated PRN code bit sequence. The accumulator and dump units are operably connected to corresponding secondary mixers for generating accumulated correlation components of the received N samples of the IF data by coherently accumulating and dumping the generated discrete correlation components of the received N samples of the IF data.

The global navigation satellite system (GNSS) receiver disclosed herein further comprises adders and subtractors operably connected to the sequential chip mixed frequency correlator array system (SCMFCAS). The adders and the subtractors are time division multiplexed for sequentially generating correlation values for a positive frequency and a negative frequency of the received N samples of the IF data by combining the accumulated correlation components of each of the Q mixed frequency correlators from each of the P signal generators. Time division multiplexing of the adders and the subtractors after the accumulation and the dumping of the generated discrete correlation components of the received N samples of the IF data, and the generation of the correlation values for the positive frequency and the negative frequency of the received N samples of the IF data using the accumulated correlation components of each of the Q mixed frequency correlators from each of the P signal generators reduce the logic area of the SCMFCAS in the GNSS baseband engine, thereby reducing power consumption of the GNSS receiver.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

FIG. 8 exemplarily illustrates a comparison table representing bit widths for parameters at different stages of correlation in a standard correlator and in one of the M mixed frequency correlators of the sequential chip mixed frequency correlator array system.

FIG. 9 exemplarily illustrates a comparison table representing resource comparison between two standard correlators and one of the M mixed frequency correlators of the sequential chip mixed frequency correlator array system.

DETAILED DESCRIPTION OF THE INVENTION

Figure 1:
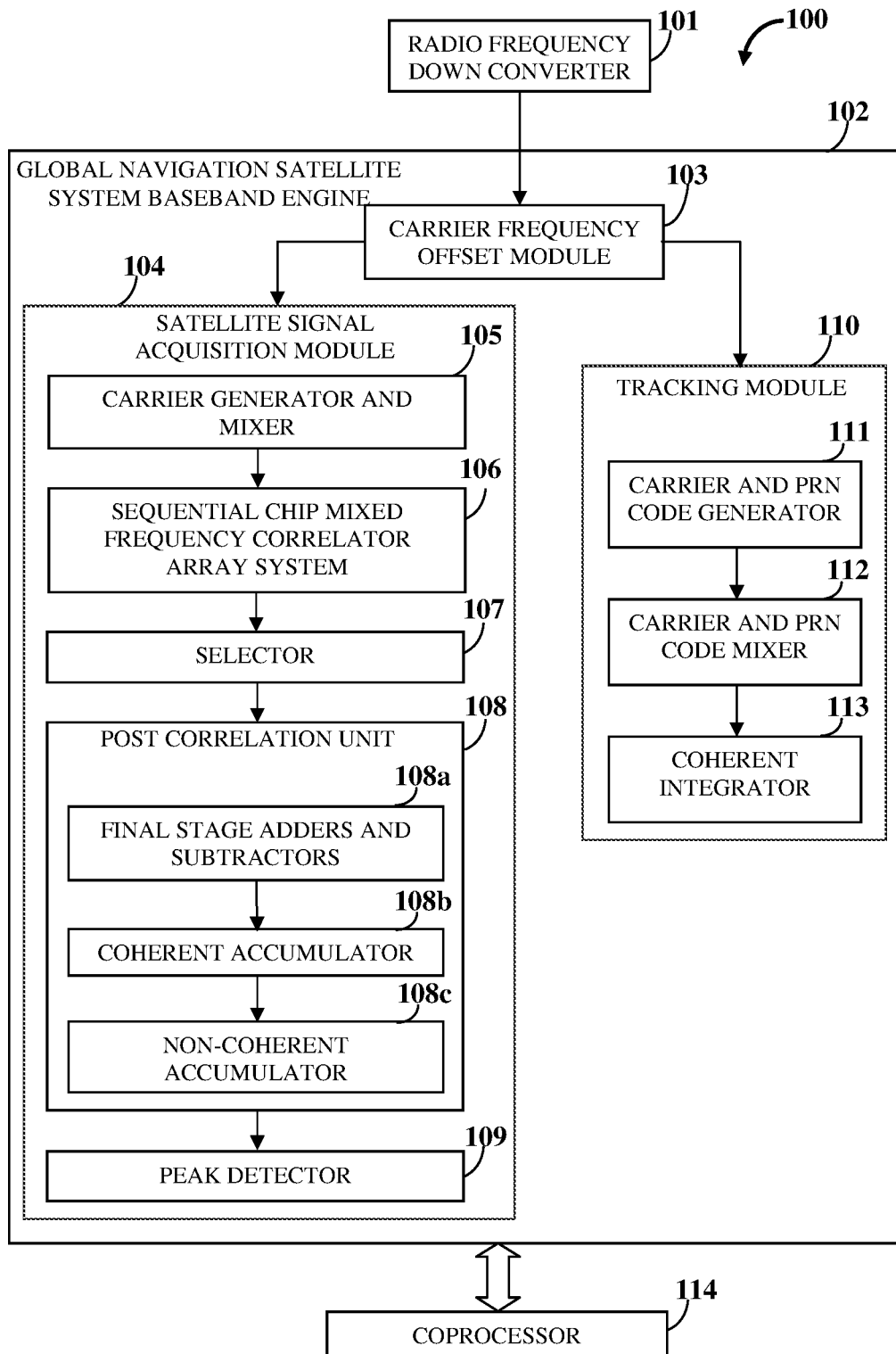
FIG. 1 exemplarily illustrates a global navigation satellite system receiver comprising a sequential chip mixed frequency correlator array system deployed in a global navigation satellite system baseband engine.

FIG. 1 exemplarily illustrates a global navigation satellite system (GNSS) receiver 100 comprising a sequential chip mixed frequency correlator array system 106 deployed in a GNSS baseband engine 102. The GNSS receiver 100 is used for acquiring and tracking multiple GNSS signals. As used herein, a "global navigation satellite system signal" refers to a navigation signal transmitted by a satellite in a GNSS constellation. For example, a global positioning system (GPS) satellite transmits GPS signals in one of L1, L2, and L5 frequency bands. The GNSS receiver 100 is programmable for acquiring a particular GNSS signal out of multiple GNSS signals used for global navigation. The GNSS receiver 100 receives a GNSS signal and acquires the received GNSS signal, if the received GNSS signal is the same as the GNSS signal programmed for acquisition. The GNSS signal received by the GNSS receiver 100 comprises a complex signal and/or a real signal having a frequency range of, for example, about 1151 megahertz (MHz) to about 2492 MHz. The GNSS signal further comprises multiple ranging codes, for example, pseudo random noise codes, and navigation data including 50 bits per second navigation data in a GPS L1 coarse/acquisition (C/A) signal. As used herein, a "pseudo random noise code" refers to a unique binary code sequence of +1s and −1s that enables the GNSS receiver 100 to identify the satellite that transmits the GNSS signal. The pseudo random noise codes are not truly random but have a finite length and are known to both a GNSS satellite and the GNSS receiver 100.

The global navigation satellite system (GNSS) receiver 100 disclosed herein comprises a radio frequency (RF) down converter 101, the GNSS baseband engine 102, and a coprocessor 114 as exemplarily illustrated in FIG. 1. In an embodiment, the RF down converter 101, the GNSS baseband engine 102, and the coprocessor 114 are implemented in a single chip. In another embodiment, the RF down converter 101, the GNSS baseband engine 102, and the coprocessor 114 are implemented independently on separate chips. In another embodiment, any combination of the RF down converter 101, the GNSS baseband engine 102, and the coprocessor 114 can be implemented as an application specific integrated circuit (ASIC) or a field programmable gate array (FPGA). The RF down converter 101 is an integrated circuit that down converts the acquired GNSS signal to an intermediate frequency (IF) signal. As used herein, "intermediate frequency signal" refers to a down converted GNSS signal. In an embodiment, the RF down converter 101 comprises an analog-to-digital converter (ADC) (not shown). The ADC samples the IF signal at a sampling rate or a sampling frequency, that is, $f_s$ megahertz (MHz) for generating N samples of IF data. In an example, if the GNSS receiver 100 receives a GNSS signal having a frequency of 1575.42 MHz, the RF down converter 101 down converts the received GNSS signal with the frequency of 1575.42 MHz to an IF signal with a frequency of $f_{IF}$ MHz. The ADC samples the IF signal with $f_{IF}$ MHz at a rate of $f_s$ MHz to generate N samples of IF data, where in one example, $f_{IF}$=4.092 MHz and $f_s$=16.368 MHz, and in another example $f_{IF}$=10.22 MHz and $f_s$=45.15 MHz.

The global navigation satellite system (GNSS) baseband engine 102 of the GNSS receiver 100 is implemented as an application specific integrated circuit (ASIC) or a field programmable gate array (FPGA) for processing the GNSS signal acquired by the GNSS receiver 100. The GNSS baseband engine 102 receives the N samples of the intermediate frequency (IF) data from the radio frequency (RF) down converter 101. The GNSS baseband engine 102 comprises a satellite signal acquisition module 104 and a tracking module 110 for acquiring and tracking a GNSS signal used for global navigation respectively. In an embodiment where the N samples of the IF data are at non-zero IF, the GNSS baseband engine 102 comprises a carrier frequency offset module 103 operably connected to the RF down converter 101. The carrier frequency offset module 103 is operably connected between the RF down converter 101, and the satellite signal acquisition module 104 and the tracking module 110 as exemplarily illustrated in FIG. 1. The carrier frequency offset module 103 receives the N samples of the IF data from the RF down converter 101 and brings the carrier frequency of the N samples of the IF data to zero or near zero by mixing the N samples of the IF data with a locally generated offsetting carrier reference signal having a frequency equal to the IF, before passing the N samples of the IF data to the satellite signal acquisition module 104 and the tracking module 110. The carrier frequency offset module 103 receives the N samples of the IF data transmitted by the RF down converter 101 and determines whether the carrier frequency of the N samples of the IF data is at zero value or a near zero value. If the carrier frequency of the N samples of the IF data is not at zero value or a near zero value, the carrier frequency offset module 103 offsets the carrier frequency of the N samples of the IF data to zero value or a near to zero value by mixing the N samples of the IF data with the locally generated offsetting carrier reference signal as disclosed in the detailed description of FIG. 4.

The satellite signal acquisition module 104 of the global navigation satellite system (GNSS) baseband engine 102 comprises a carrier generator and mixer 105, the sequential chip mixed frequency correlator array system (SCMFCAS) 106, a selector 107, a post correlation unit 108, and a peak detector 109. The carrier generator and mixer 105 comprises a carrier numerically controlled oscillator (NCO) (not shown), a code NCO (not shown), and a carrier mixer (not shown). The carrier NCO is a digital signal generator that generates a local copy of a carrier signal with a carrier Doppler frequency offset, where the carrier Doppler frequency offset is programmable. The code NCO generates a signal with a programmed code Doppler frequency that is used to generate a pseudo random noise (PRN) code. The code Doppler frequency is derived from the carrier Doppler frequency. The carrier generator and mixer 105 of the satellite signal acquisition module 104 receives the N samples of the zero or near zero IF data, for example, (p, q), transmitted by the carrier frequency offset module 103, where the N samples of the zero or near zero IF data refers to the N samples of the IF data with zero or near zero carrier frequency. The received N samples of the zero or near zero IF data contain oscillator drifts of the GNSS receiver 100 along with a frequency deviation due to a relative motion between the GNSS receiver 100 and satellites of the GNSS constellation. The frequency of the N samples of the zero or near zero IF data comprising the frequency deviation and the oscillator drifts is referred to as "Doppler frequency". The Doppler frequency is in the range of, for example, about +128 kilohertz (KHz) to about −128 KHz. For example, if the SCMFCAS 106 is used to process the N samples of the zero or near zero IF data having a Doppler frequency ($\Delta F_b$) of +128 KHz and −128 KHz, code bits generated by the code NCO will have a significant drift in the PRN code that is generated.

The carrier numerically controlled oscillator (NCO) of the carrier generator and mixer 105 generates a local copy of the carrier signal in the frequency range of, for example, about +128 KHz to about −128 KHz or higher. Consider an example where the carrier NCO generates a carrier signal of a carrier Doppler frequency +128 KHz. The code NCO generates a code Doppler frequency, derived from the carrier Doppler frequency, which is used for generating pseudo random noise (PRN) code bits. Therefore, the code NCO generates a code Doppler frequency that corresponds to +128 KHz of the carrier frequency offset being searched, which operates normally for a mixed frequency correlator in the sequential chip mixed frequency correlator array system (SCMFCAS) 106 that corresponds to the carrier Doppler frequency +128 KHz. As used herein, "mixed frequency correlator" refers to a correlator used in the SCMFCAS 106 within the satellite signal acquisition module 104 during an acquisition stage of global navigation satellite system (GNSS) signal processing for simultaneously processing two frequencies, that is, a positive frequency and a negative frequency of a GNSS signal transmitted by the satellites in the GNSS constellation. The carrier Doppler frequency refers to a sum of oscillator drifts and a frequency shift caused by the rate of change in range with reference to a satellite and the GNSS receiver 100. However, the mixed frequency correlator that corresponds to the carrier Doppler frequency −128 KHz expects the code NCO to generate a code Doppler frequency that corresponds to −128 KHz.

Due to the change in the code Doppler frequency from +128 KHz to −128 KHz, the generated pseudo random noise (PRN) code bit drifts in the opposite direction compared to that of the generated PRN code bit at a frequency bin searching +128 KHz. The drift in the generated PRN code bit limits total integration time as power spreads across multiple PRN code bit correlators, if integrated beyond a certain time period (T). The time period (T) over which the total PRN code bit drift is less than 0.25 code chip is accepted during typical acquisition. The PRN code bit drift at the mixed frequency correlator operating at −128 KHz is computed as code drift=T*2*$\Delta F_b$, where $\Delta F_b$ is the Doppler frequency. If the code NCO generates a 0 hertz (Hz) code Doppler frequency, then the drift at +128 KHz and −128 KHz is equal and is computed as (T*$\Delta F_b$). To reduce the impact of the Doppler frequency, the carrier generator and mixer 105 employs two-stage carrier generation and mixing. The full carrier Doppler frequency search range is split into multiple sub ranges, each with its own center frequency. In the first stage, the carrier generator and mixer 105 brings down the center frequency of each of the carrier Doppler frequency sub ranges to zero. The code NCO generates a code Doppler frequency that is proportional to the center frequency of the carrier Doppler frequency sub range. The second stage enables searching of the frequencies around 0 Hz within a bandwidth of each sub range. This reduces the maximum deviation between the carrier Doppler frequency and the code Doppler frequency, that is, code drift to +/−(sub range bandwidth/2). Thus, the code drift of the generated PRN code bits is small, thereby providing a longer integration time period. The carrier mixer of the carrier generator and mixer 105 mixes the received N samples of the zero or near zero IF data (p,q) with the generated local copy of the carrier signal to generate N samples of the zero or near zero IF data, that is, (a, b). The output of the carrier generator and mixer 105 is represented, for example, as (a+jb), where "a" refers to a real part of the complex IF data and "jb" refers to an imaginary part of the complex IF data, and where "j" is an imaginary unit equal to square root of negative one, that is, j=$\sqrt{-1}$. The generated N samples of the zero or near zero IF data contain lower oscillator drifts and lower frequency deviations.

The sequential chip mixed frequency correlator array system (SCMFCAS) 106 comprises P signal generators deployed in the global navigation satellite system (GNSS) baseband engine 102, where P is a positive integer. Each of the P signal generators comprises Q mixed frequency correlators, where Q is a positive integer. A product of the number of signal generators (P) and the number of mixed frequency correlators per signal generator (Q) provides a total number of mixed frequency correlators (M) in the SCMFCAS 106, that is, M=P*Q, where M is a positive integer. The SCMFCAS 106 processes the N samples of the intermediate frequency (IF) data transmitted by the carrier generator and mixer 105. Each of the M mixed frequency correlators generates accumulated correlation components of the N samples of the IF data corresponding to the received GNSS signal. As used herein, "accumulated correlation components" refer to values that indicate correlation between the N samples of the IF data with the locally generated pseudo random noise (PRN) code and the locally generated carrier signal as disclosed in the detailed description of FIG. 3.

The selector 107 of the satellite signal acquisition module 104, for example, a multiplexer, is programmable for selecting the generated accumulated correlation components of the N samples of the IF data from one of the M mixed frequency correlators of the sequential chip mixed frequency correlator array system (SCMFCAS) 106. The selector 107 transmits the selected accumulated correlation components of the N samples of the IF data to the post correlation unit 108. To increase the signal-to-noise ratio, the selected accumulated correlation components of the N samples of the IF data are further coherently and/or non-coherently integrated, in the post correlation unit 108 to obtain new correlation values. If the new correlation values are greater than a threshold value, then the global navigation satellite system (GNSS) receiver 100 declares that the GNSS signal that is being searched is present in the incoming GNSS signal, else the GNSS receiver 100 declares that the GNSS signal that is being searched is not present in the incoming GNSS signal.

The post correlation unit 108 of the satellite signal acquisition module 104 comprises final stage adders and subtractors 108a, a coherent accumulator 108b, and a non-coherent accumulator 108c. The final stage adders and subtractors 108a sequentially generate correlation values for a positive frequency and a negative frequency of the N samples of the intermediate frequency (IF) data by combining the accumulated correlation components of each of the Q mixed frequency correlators from each of the P signal generators. As used herein, "correlation values" refers to values that measure change in power and direction between two signals, for example, the received global navigation satellite system (GNSS) signal and a local carrier and pseudo random noise (PRN) code reference signal. As used herein, "local carrier and PRN code reference signal" refers to a combination of the carrier signal generated using a local carrier generator, that is, a carrier numerically controlled oscillator (NCO), and a PRN code bit sequence generated using a PRN code generator driven by a code NCO in the sequential chip mixed frequency correlator array system (SCMFCAS) 106. As used herein, "pseudo random noise code bit sequence" refers to a sequence of +1's and −1's that enables the GNSS receiver 100 to compute travelling time of the GNSS signal from a satellite to the GNSS receiver 100 and satellite coordinates at any epoch. The received GNSS signal is correlated with the local carrier and PRN code reference signal.

Figure 3:
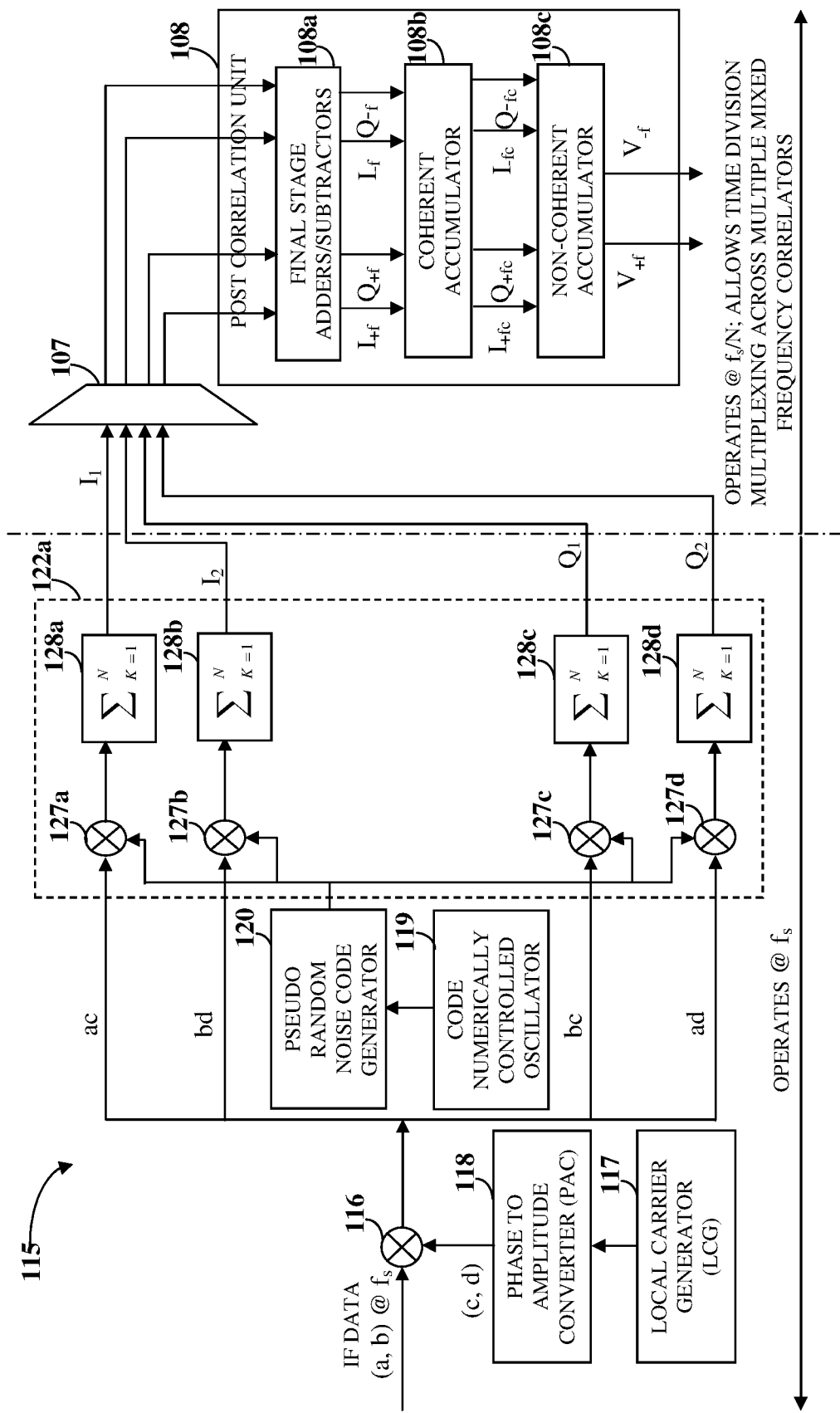
FIG. 3 illustrates components of one of the M mixed frequency correlators of the sequential chip mixed frequency correlator array system operably connected to a post correlation unit of the satellite signal acquisition module.

The coherent accumulator 108b of the post correlation unit 108 performs programmable coherent integration of the correlation values of the positive frequency and the negative frequency of the N samples of the intermediate frequency (IF) data to obtain coherent integration correlation values as disclosed in detailed description of FIG. 3. The non-coherent accumulator 108c performs programmable non-coherent integration of the correlation values of the positive frequency and the negative frequency of the N samples of the IF data to obtain non-coherent integration correlation values as disclosed in the detailed description of FIG. 3. The coherent integration operation and the non-coherent integration operation are performed over the outputs of the M mixed frequency correlators of the sequential chip mixed frequency correlator array system (SCMFCAS) 106 sequentially.

The peak detector 109 of the satellite signal acquisition module 104 detects a peak among the non-coherent integration values generated by the non-coherent accumulator 108c of the post correlation unit 108. The satellite signal acquisition module 104 acquires the received global navigation satellite system (GNSS) signal based on the detected peak. A high peak value is obtained if the received GNSS signal is the same as the local carrier and pseudo random noise (PRN) code reference signal and the satellite signal acquisition module 104 acquires the received GNSS signal. The satellite signal acquisition module 104 is sequentially processed at a rate of $P \times f_s$ for acquiring P GNSS signals, where P is any positive integer and $f_s$ is the sampling frequency used for sampling the down converted first GNSS signal. After acquisition, the GNSS receiver 100 enters a tracking mode.

The tracking module 110 of the global navigation satellite system (GNSS) baseband engine 102 is used for tracking a second GNSS signal. The tracking module 110 performs tracking of either a positive frequency GNSS signal or a negative frequency GNSS signal. The second GNSS signal can be either the GNSS signal acquired by the satellite signal acquisition module 104, or a GNSS signal specifically programmed for tracking. The tracking module 110 comprises a carrier and pseudo random noise (PRN) code generator 111, a carrier and PRN code mixer 112, and a coherent integrator 113. The carrier and PRN code generator 111 generates a carrier reference signal and a pseudo random noise (PRN) code bit sequence corresponding to the second GNSS signal. The PRN code bit sequence comprises, for example, a coarse/acquisition (C/A) code bit sequence, a military (M) code bit sequence, a precision (P) code bit sequence, and a maximal length code bit sequence.

The carrier and pseudo random noise (PRN) code mixer 112 of the tracking module 110 generates inphase components and quadrature phase components of the second global navigation satellite system (GNSS) signal by mixing the carrier reference signal with a down converted and sampled second GNSS signal. As used herein, "inphase components" refer to components that are offset in phase by a zero cycle (zero radians) in relation to the GNSS signal. The inphase components of the second GNSS signal are components that are in-phase with the second GNSS signal. Also, as used herein, "quadrature phase components" refer to components that are offset in phase by a one-quarter cycle ($\pi/2$ radians) in relation to the GNSS signal. The quadrature phase components of the second GNSS signal are components that are 90° out of phase with the second GNSS signal. Furthermore, the carrier and PRN code mixer 112 generates correlation values of the second GNSS signal by mixing the inphase components and the quadrature phase components of the second GNSS signal with the PRN code bit sequence.

The coherent integrator 113 of the tracking module 110 generates coherent integration data by accumulating the correlation values of the second global navigation satellite system (GNSS) signal for a time duration that is programmed by the coprocessor 114. The coprocessor 114 is in operable communication with the satellite signal acquisition module 104 and the tracking module 110 of the GNSS baseband engine 102. The coprocessor 114 programs parameters comprising, for example, the carrier intermediate frequency (IF), the carrier frequency offset, the carrier Doppler frequency, the code Doppler frequency, the pseudo random noise (PRN) code and its code phase, a coherent integration period, and a non-coherent integration period, of the M mixed frequency correlators. The coprocessor 114 uses the satellite signal acquisition module 104 to search the entire frequency search range of the GNSS signal and also programs the tracking module 110 with the same set of parameters to continuously track the GNSS signal.

Figure 2:
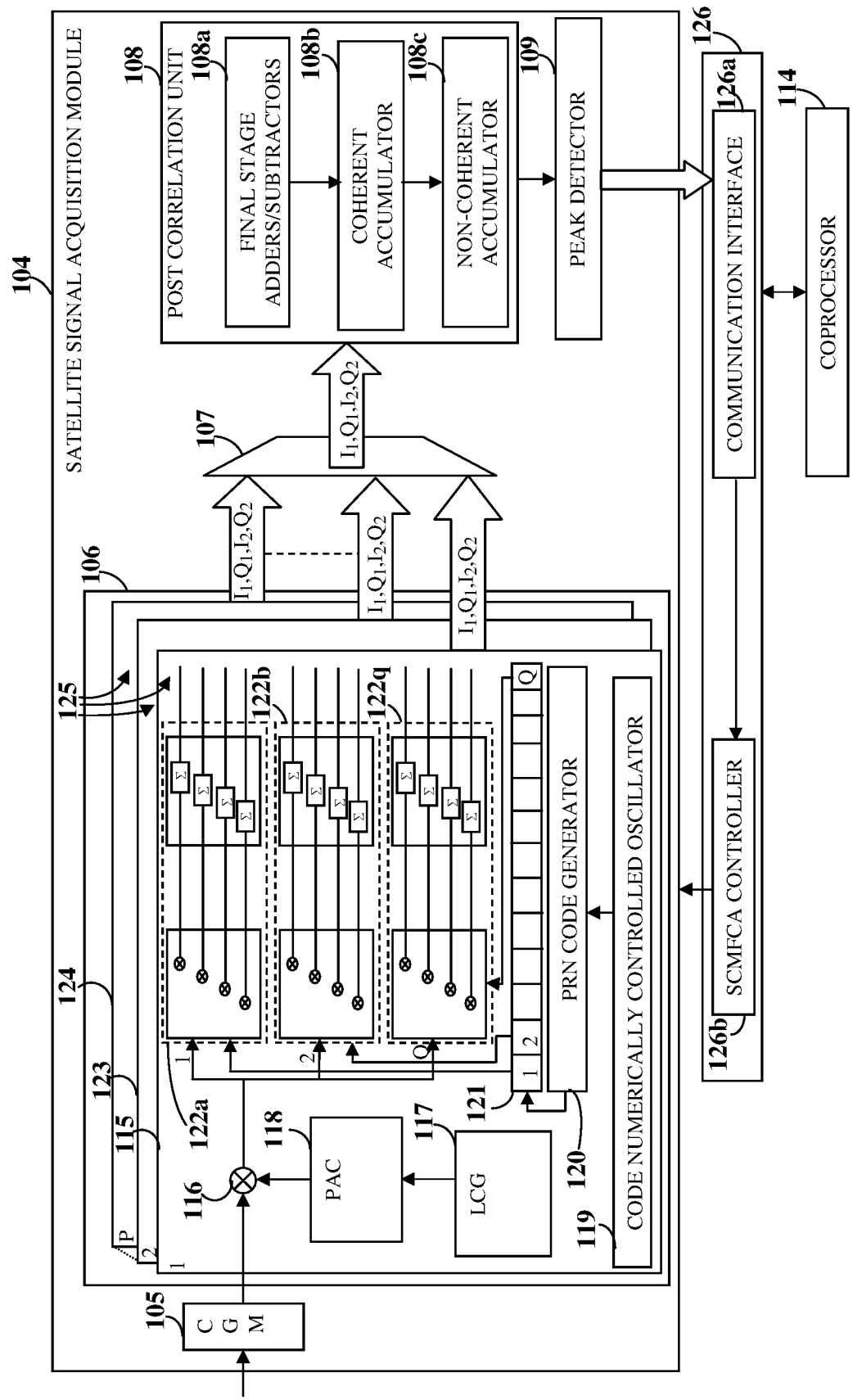
FIG. 2 illustrates a satellite signal acquisition module of the global navigation satellite system receiver, showing P signal generators of the sequential chip mixed frequency correlator array system.

FIG. 2 exemplarily illustrates the satellite signal acquisition module 104 of the global navigation satellite system (GNSS) receiver 100 exemplarily illustrated in FIG. 1, showing P signal generators 115, 123, and 124 of the sequential chip mixed frequency correlator array system (SCMFCAS) 106, where P is a positive integer. In an embodiment, the radio frequency (RF) down converter 101 of the GNSS receiver 100 transmits the N samples of the IF data to the SCMFCAS 106 through the carrier frequency offset module 103 and the carrier generator and mixer (CGM) 105 exemplarily illustrated in FIG. 1. The N samples of the IF data received by the SCMFCAS 106 comprises a zero offset carrier frequency. FIG. 2 exemplarily illustrates the arrangement of the carrier generator and mixer 105, the SCMFCAS 106, the selector 107, the post correlation unit 108 with the final stage adders and subtractors 108a, the coherent accumulator 108b, and the non-coherent accumulator 108c, and the peak detector 109 in the satellite signal acquisition module 104, which function as disclosed in the detailed description of FIG. 1. Each of the P signal generators 115, 123, and 124 of the SCMFCAS 106 comprises a primary mixer 116, a single local carrier generator (LCG) 117, a phase to amplitude converter (PAC) 118, a single pseudo random noise code generator 120, a linear feedback shift register 121, and Q mixed frequency correlators 122a, 122b, . . . , to 122q, where Q is a positive integer.

The primary mixer 116 is a complex mixer, for example, a complex intermediate frequency (IF) mixer. The primary mixer 116 receives N samples of IF data represented as (a, b) at a sampling rate $f_s$ from the radio frequency (RF) down converter 101 and generates inphase components and quadrature phase components of the received N samples of the IF data by mixing the received N samples of the IF data with a carrier reference signal locally generated by the local carrier generator 117. The inphase components of the received N samples of the IF data refer to components that are offset in phase by a zero cycle. The quadrature phase components of the received N samples of the IF data refer to components that are offset in phase by a one-quarter cycle. The N samples of the IF data correspond to a GNSS signal received by the RF down converter 101. The N samples of the IF data comprise complex IF data or real IF data. The single local carrier generator 117, for example, a numerically controlled oscillator (NCO) is implemented in series with the phase to amplitude converter 118 to generate the locally generated carrier reference signal ($\Delta F_s$) of a numerically controlled oscillator frequency ($f_{NCO}$). The primary mixer 116 of the signal generator 115 mixes the received N samples of the IF data with the locally generated carrier reference signal for generating the inphase components and the quadrature phase components of the received N samples of the IF data. The generated inphase components and the generated quadrature phase components of the received N samples of the IF data are transmitted to each of the Q mixed frequency correlators 122a, 122b, . . . , to 122q. Similarly, the inphase components and the quadrature phase components of the received N samples of the IF data generated by the primary mixer 116 of each of the other signal generators 123 and 124 are transmitted to each of the Q mixed frequency correlators 122a, 122b, . . . , to 122q of each of the other signal generators 123 and 124.

Consider an example where N samples of complex intermediate frequency (IF) data (a, b) having a sampling rate $f_s$ are mixed with a complex carrier reference signal (c, d) of $f_{NCO}$ using the primary mixer 116 to generate inphase components (ac, bd) and quadrature phase components (bc, ad). The $f_{NCO}$ can be much lesser than that of the $f_s$, thereby saving switching power of the single local carrier generator 117. The generated inphase components comprise a first inphase component (ac) and a second inphase component (bd). The generated quadrature phase components comprise a first quadrature phase component (bc) and a second quadrature phase component (ad). The operation of the sequential chip mixed frequency correlator array system (SCMFCA) 106 in the above example is described for a complex IF data input. In case of a real IF data input, the real IF data is converted into a complex IF data in the carrier frequency offset module 103, before transmission to the SCMFCAS 106. For example, real IF data is converted into complex IF data using the carrier frequency offset module 103, and the inphase output and the quadrature phase output of the carrier frequency offset module 103 form the complex IF data for the SCMFCAS 106.

The single pseudo random noise (PRN) code generator 120 generates a PRN code bit sequence. The generated PRN code bit sequence corresponds to the global navigation satellite system (GNSS) signal received by the radio frequency (RF) down converter 101. A code numerically controlled oscillator (NCO) 119 is operably connected to the single PRN code generator 120 for generating the PRN code bit sequence corresponding to the received GNSS signal. For example, the code NCO 119 connected in series with the single PRN code generator 120 and the phase to amplitude converter 118 generates a coarse/acquisition (C/A) code replica sequence if the received GNSS signal is a global positioning system (GPS) satellite signal. Each of the Q mixed frequency correlators 122a, 122b, . . . , to 122q is operably connected to the primary mixer 116 and to the single PRN code generator 120 via a linear feedback shift register (LFSR) 121. The LFSR 121 is programmed such that the generated PRN code bit sequence is delayed for a predetermined time before transmitting the generated PRN code bit sequence to the subsequent mixed frequency correlators, for example, 122b, . . . , to 122q.

Each of the Q mixed frequency correlators 122a, 122b, . . . , to 122q in the signal generator 115 generates inphase accumulated correlation components and quadrature phase accumulated correlation components by processing the generated inphase components and the generated quadrature phase components of the N samples of the intermediate frequency (IF) data transmitted by the primary mixer 116 as disclosed in the detailed description of FIG. 3. Similarly, each of the Q mixed frequency correlators 122a, 122b, . . . , to 122q in the other signal generators 123 and 124 generates inphase accumulated correlation components and quadrature phase accumulated correlation components by processing the inphase components and the quadrature phase components of the N samples of the IF data transmitted by the primary mixer 116 of each of the other signal generators 123 and 124.

The sequential chip mixed frequency correlator array system (SCMFCAS) 106 transmits the inphase accumulated correlation components and the quadrature phase accumulated correlation components generated by each of the Q mixed frequency correlators 122a, 122b, . . . , to 122q from each of the P signal generators 115, 123, and 124 to the post correlation unit 108 using the selector 107 for processing as disclosed in the detailed description of FIG. 3. All the Q mixed frequency correlators 122a, 122b, . . . , to 122q in the signal generator 115 employ a single local carrier generator 117 and a single pseudo random noise (PRN) code generator 120 to generate the inphase accumulated correlation components and the quadrature phase accumulated correlation components of the N samples of the IF data as compared to a standard correlator which requires a local carrier generator and a PRN code generator per correlator. Similarly, all the Q mixed frequency correlators 122a, 122b, . . . , to 122q in each of the other signal generators 123 and 124 employs only a single local carrier generator 117 and a single PRN code generator 120 to generate the inphase accumulated correlation components and the quadrature phase accumulated correlation components of the N samples of the IF data. This reduction in the number of the local carrier generators 117 and the PRN code generators 120 reduces the power consumption of the SCMFCAS 106, thereby reducing the total power consumption of the global navigation satellite system (GNSS) receiver 100.

The global navigation satellite system (GNSS) receiver 100 further comprises a feedback module 126 for providing feedback to the satellite signal acquisition module 104 of the GNSS baseband engine 102 exemplarily illustrated in FIG. 1. The feedback module 126 comprises a sequential chip mixed frequency correlator array (SCMFCA) controller 126b and a communication interface 126a. The satellite signal acquisition module 104 is in operable communication with the coprocessor 114 via the communication interface 126a. The communication interface 126a is positioned between the SCMFCA controller 126b and the coprocessor 114. The SCMFCA controller 126b receives correlator programming parameters comprising, for example, a code phase offset, a code frequency, a carrier frequency, and a code chip offset from the coprocessor 114 through the communication interface 126a for programming the single local carrier generator 117 and the single pseudo random noise (PRN) code generator 120 of each of the P signal generators 115, 123, and 124. As used herein, "code phase offset" refers to an offset in a phase of the PRN code bit sequence generated by the PRN code generator 120. Also, as used herein, "code frequency" refers to a frequency of the PRN code bit sequence that needs to be generated. Also, as used herein, "code chip offset" refers to an offset that indicates a particular bit in the PRN code bit sequence. Also, as used herein, "carrier frequency" refers to a frequency that needs to be searched. Similarly, each of the P signal generators 115, 123, and 124 can be programmed with any combination of the correlator programming parameters. The correlator programming parameters are derived based on an acquisition search space and a predetermined strategy selected to search GNSS signals. For example, for acquiring global positioning system (GPS) L1 C/A signals, the entire search space comprising code phase offset=0, code frequency=1.023e6, code chip offset=0 to M−1 for searching from a first code chip of the PRN code bit sequence, and carrier frequency=250 Hz is searched. The SCMFCA controller 126b also receives parameters for programming the selector 107 for selecting the inphase accumulated correlation components and the quadrature phase from one of the M mixed frequency correlators 125. For example, the parameters for programming the selector 107 comprise an order in which the output of the M mixed frequency correlators 125 should be transmitted to the post correlation unit 108.

FIG. 3 exemplarily illustrates components of one of the M mixed frequency correlators 125, for example, a mixed frequency correlator 122a of the signal generator 115 of the sequential chip mixed frequency correlator array system (SCMFCAS) 106 operably connected to the post correlation unit 108 of the satellite signal acquisition module 104 exemplarily illustrated in FIGS. 1-2. M is a positive integer. M mixed frequency correlators 125 refer to the total number of mixed frequency correlators 125 in the SCMFCAS 106 as disclosed in detailed description of FIGS. 1-2. Each of the M mixed frequency correlators 125 including the Q mixed frequency correlators 122a, 122b, . . . , to 122q of the P signal generators 115, 123, and 124 exemplarily illustrated in FIG. 2, comprises secondary mixers 127a, 127b, 127c, and 127d, and accumulator and dump units 128a, 128b, 128c, and 128d as exemplarily illustrated in FIG. 3. The secondary mixers 127a, 127b, 127c, and 127d are simple code mixers. The secondary mixers 127a, 127b, 127c, and 127d are operably connected to the primary mixer 116 for generating discrete correlation components of the received N samples of the intermediate frequency (IF) data by individually mixing the generated inphase components and the generated quadrature phase components of the received N samples of the IF data with the pseudo random noise (PRN) code bit sequence. As used herein, "discrete correlation components" refer to components that quantify how closely the generated inphase components, the quadrature phase components, and the PRN code bit sequence match with the carrier and PRN code sequence in the received N samples of the IF data.

In the example disclosed in the detailed description of FIG. 2, the inphase components (ac, bd) and the quadrature phase components (bc, ad) outputted by the primary mixer 116 are mixed with a pseudo random noise (PRN) code bit sequence using the secondary mixers 127a, 127b, 127c, and 127d to generate the discrete correlation components (ac*p, bd*p, bc*p, and ad*p), where p is equal to a code bit in the full PRN code bit sequence at a given instant of time. The secondary mixer 127a generates a first inphase discrete correlation component (ac*p) by mixing the first inphase component (ac) transmitted by the primary mixer 116 with the generated PRN code bit sequence. The secondary mixer 127b generates a second inphase discrete correlation component (bd*p) by mixing the second inphase component (bd) transmitted by the primary mixer 116 with the generated PRN code bit sequence. The secondary mixer 127c generates a first quadrature phase discrete correlation component (bc*p) by mixing the first quadrature phase component (bc) transmitted by the primary mixer 116 with the generated PRN code bit sequence. The secondary mixer 127d generates a second quadrature phase discrete correlation component (ad*p) by mixing the second quadrature phase component (ad) transmitted by the primary mixer 116 with the generated PRN code bit sequence.

The accumulator and dump units 128a, 128b, 128c, and 128d are electronic registers that store data. The accumulator and dump units 128a, 128b, 128c, and 128d are operably connected to the corresponding secondary mixers 127a, 127b, 127c, and 127d respectively, for generating accumulated correlation components of the received N samples of the intermediate frequency (IF) data by coherently accumulating and dumping the generated discrete correlation components of the received N samples of the IF data. The accumulated correlation components are values generated by the accumulator and dump units 128a, 128b, 128c, and 128d by coherently accumulating the discrete correlation components of each of the N samples of the IF data over a predetermined duration. The accumulator and dump unit 128a generates a first inphase accumulated correlation component ($I_1$) by coherently accumulating the first inphase discrete correlation component of each of the N samples of the IF data transmitted by the secondary mixer 127a. The accumulator and dump unit 128b generates a second inphase accumulated correlation component ($I_2$) by coherently accumulating the second inphase discrete correlation component of each of the N samples of the IF data transmitted by the secondary mixer 127b. The accumulator and dump unit 128c generates a first quadrature phase accumulated correlation component ($Q_1$) by coherently accumulating the first quadrature phase discrete correlation component of each of the N samples of the IF data transmitted by the secondary mixer 127c. The accumulator and dump unit 128d generates a second quadrature phase accumulated correlation component ($Q_2$) by coherently accumulating the second quadrature phase discrete correlation component of each of the N samples of the IF data transmitted by the secondary mixer 127d. The accumulator and dump units 128a, 128b, 128c, and 128d sequentially accumulate the outputs generated by the secondary mixers 127a, 127b, 127c, and 127d respectively, over a time duration equal to a total time period of the N samples of the IF data. In the above example, the accumulation and dump units 128a, 128b, 128c, and 128d therefore accumulate the discrete correlation components (ac*p, bd*p, bc*p, and ad*p) generated by the secondary mixers 127a, 127b, 127c, and 127d respectively, for generating inphase accumulated correlation components ($I_1$ and $I_2$) and quadrature phase accumulated correlation components ($Q_1$ and $Q_2$) of the N samples of the IF data as disclosed below, where "p" is a PRN code bit at the time of mixing the inphase components (ac, bd) and the quadrature phase components (bc, ad) with the PRN code bit sequence.

$$I_1 = \sum_{k=1}^{N} ac_k * p_k$$

$$I_2 = \sum_{k=1}^{N} bd_k * p_k$$

$$Q_1 = \sum_{k=1}^{N} bc_k * p_k$$

$$Q_2 = \sum_{k=1}^{N} ad_k * p_k$$

The mixed frequency correlator 122a along with the other of the M mixed frequency correlators 125 of the sequential chip mixed frequency correlator array system (SCMFCAS) 106 exemplarily illustrated in FIG. 2, are operably connected to the post correlation unit 108 comprising the final stage adders and subtractors 108a, the coherent accumulator 108b, and the non-coherent accumulator 108c via the selector 107. The final stage adders and subtractors 108a are operably connected to the SCMFCAS 106 and time division multiplexed for sequentially generating correlation values for a positive frequency and a negative frequency of the received N samples of the intermediate frequency (IF) data by combining the accumulated correlation components of each of the Q mixed frequency correlators 122a, 122b, . . . , to 122q from each of the P signal generators 115, 123, and 124. In an embodiment, the architecture of the satellite signal acquisition module 104 exemplarily illustrated in FIGS. 2-3, facilitates time division multiplexing of the final stage adders and subtractors 108a required for generating correlation values that correspond to positive and negative local carrier signals. The final stage adders and subtractors 108a sequentially generate the correlation values by addition and/or subtraction of the inphase accumulated correlation components and the quadrature phase accumulated correlation components of the N samples of the IF data of each of the Q mixed frequency correlators 122a, 122b, . . . , to 122q from each of the P signal generators 115, 123, and 124. The accumulated correlation components of the accumulator and dump units 128a, 128b, 128c, and 128d are transmitted to the final stage adders and subtractors 108a using the selector 107. The selector 107 is, for example, a multiplexer programmed for selecting and transmitting one set of the inphase accumulated correlation components and the quadrature phase accumulated correlation components generated by one of the M mixed frequency correlators 125, for example, the mixed frequency correlator 122a of the signal generator 115 of the SCMFCAS 106 to the final stage adders and subtractors 108a of the post correlation unit 108.

The selector 107 is programmed such that the final stage adders and subtractors 108a appear on a common signal path only a fraction of time in a predetermined pattern. The predetermined pattern of switching the final stage adders and subtractors 108a at the end of the common signal path using the selector 107 is known as time division multiplexing of the final stage adders and subtractors 108a. Time division multiplexing of the final stage adders and subtractors 108a after the accumulation and the dumping of the generated discrete correlation components of the received N samples of the intermediate frequency (IF) data, and generation of the correlation values for the positive frequency and the negative frequency of the received N samples of the IF data using the accumulated correlation components of each of the Q mixed frequency correlators 122a, 122b, . . . , to 122q from each of the P signal generators 115, 123, and 124 reduce logic area of the sequential chip mixed frequency correlator array system (SCMFCAS) 106 in the global navigation satellite system (GNSS) baseband engine 102, thereby reducing power consumption of the GNSS receiver 100 exemplarily illustrated in FIG. 1. For example, a typical GNSS receiver with M mixed frequency correlators employs M post correlation units to process the outputs from the M mixed frequency correlators, whereas the GNSS receiver 100 disclosed herein employing the SCMFCAS 106 uses only a single post correlation unit 108 to process the outputs from all the M mixed frequency correlators 125 of the SCMFCAS 106, thereby providing a reduction of (M−1) post correlation units and eliminating leakage power from each of the (M−1) post correlation units. The magnitude of reduction in logic area and power consumption of the SCMFCAS 106 is directly proportional to M, that is, to the total number of mixed frequency correlators 125 in the SCMFCAS 106. The logic area is reduced due to the reduction in the number of mixed frequency correlators 125 required in the SCMFCAS 106. In an example where 160,000 bins are to be searched, the total number of mixed frequency correlators 125 required by the SCMFCAS 106 to search the GNSS signal over the 160,000 bins is 80,000 as compared to 160,000 correlators required in the case of a conventional, standard correlator system. Therefore, the satellite signal acquisition module 104 in the SCMFCAS 106 disclosed herein saves nearly 50% of logic area and power consumed when compared with that of a conventional, standard correlator based satellite signal acquisition module.

The time division multiplexed final stage adders and subtractors 108a combine the inphase accumulated correlation components and the quadrature phase accumulated correlation components of the N samples of the intermediate frequency (IF) data received from the accumulator and dump units 128a, 128b, 128c, and 128d of the mixed frequency correlators 122a, 122b, . . . , to 122q in the signal generator 115 in a predetermined pattern to generate the correlation values for the positive frequency and the negative frequency of the N samples of the IF data of the received GNSS signal. In the above example, the accumulation and dump units 128a, 128b, 128c, and 128d transmit the generated inphase accumulated correlation components ($I_1$, $I_2$) and the quadrature phase accumulated correlation components ($Q_1$, $Q_2$) of the N samples of the IF data to the time division multiplexed final stage adders and subtractors 108a to generate an inphase correlation value ($I_f$) and a quadrature phase correlation value ($Q_f$) for the positive frequency, that is, ($I_{+f} = I_1 - I_2$ and $Q_{+f} = Q_1 + Q_2$) respectively, herein referred to as "positive frequency correlation values", and to generate an inphase correlation value ($I_f$) and a quadrature phase correlation value ($Q_f$) for the negative frequency, that is, ($I_{-f} = I_1 + I_2$ and $Q_{-f} = Q_1 - Q_2$) respectively, herein referred to as "negative frequency correlation values", of the N samples of the IF data.

Time division multiplexing the final stage adders and subtractors 108a across the M mixed frequency correlators 125 of the sequential chip mixed frequency correlator array system (SCMFCAS) 106 reduces the number of mixed frequency correlators 125 required by the SCMFCAS 106, for example, by 50% as compared to the number of correlators required in a conventional, standard correlator to generate the correlation values of the positive frequency and the negative frequency of the N samples of the intermediate frequency data. This reduction in the number of the mixed frequency correlators 125 in the SCMFCAS 106 considerably reduces the power consumed by the global navigation satellite system (GNSS) baseband engine 102, thereby reducing the power consumption of the GNSS receiver 100. For example, a GNSS receiver employing a conventional, standard correlator consumes 100 milliwatts (mW) of power during an acquisition process, whereas the GNSS receiver 100 employing the SCMFCAS 106 disclosed herein consumes about 50 mW of power for the acquisition process. The SCMFCAS 106 achieves the same time to first fix as compared to the conventional, standard correlator, to generate the correlation values of both the positive frequency and the negative frequency of the received GNSS signal.

Bit width of the discrete correlation components generated by the secondary mixers 127a, 127b, 127c, and 127d and the accumulated correlation components generated by the accumulator and dump units 128a, 128b, 128c, and 128d of one of the M mixed frequency correlators 125, for example, the mixed frequency correlator 122a is one bit smaller compared to that of the conventional, standard correlator. The reduction in bit width further reduces the logic area and the power consumption of the M mixed frequency correlators 125 of the sequential chip mixed frequency correlator array system (SCMFCAS) 106, thereby further reducing the power consumption of the global navigation satellite system (GNSS) baseband engine 102 and the GNSS receiver 100. For example, the SCMFCAS 106 saves 8 bits in total per mixed frequency correlator compared to the conventional, standard correlator. Therefore, total bits saved by the M mixed frequency correlators 125 in the SCMFCAS 106 is equal to 8*M bits. The bit widths for parameters at different stages of the correlation in the conventional, standard correlator and one of the M mixed frequency correlators 125 of the SCMFCAS 106 is disclosed in the detailed description of FIG. 8.

The coherent accumulator 108b of the post correlation unit 108 is operably connected to the final stage adders and subtractors 108a as exemplarily illustrated in FIG. 3. The coherent accumulator 108b generates coherent integration values corresponding to the positive frequency and the negative frequency of the received N samples of the intermediate frequency (IF) data by performing programmable coherent integration of the positive frequency correlation values and the negative frequency correlation values of the received N samples of the IF data over a predetermined duration of time. As used herein, "programmable coherent integration" refers to accumulation of the positive frequency correlation values and the negative frequency correlation values of the N samples of the IF data over a predetermined duration of time programmed by the coprocessor 114 exemplarily illustrated in FIGS. 1-2. The coherent accumulator 108b performs coherent integration of the positive frequency correlation values and the negative frequency correlation values sequentially generated by the final stage adders and subtractors 108a by combining the accumulated correlation components of each of the Q mixed frequency correlators 122a, 122b, . . . , to 122q from each of the P signal generators 115, 123, and 124. The final stage adders and subtractors 108a sequentially transmit the sequentially generated positive frequency correlation values and negative frequency correlation values to the coherent accumulator 108b for coherent integration. In the above example, the final stage adders and subtractors 108a transmit the positive frequency correlation values ($I_{+f}$, $Q_{+f}$) and the negative frequency correlation values ($I_{-f}$, $Q_{-f}$) of the N samples of the IF data to the coherent accumulator 108b. The coherent accumulator 108b generates positive coherent integration values ($I_{+fc}$ and $Q_{+fc}$) and negative coherent integration values ($I_{-fc}$ and $Q_{-fc}$) as disclosed below, by performing coherent integration of the positive frequency correlation values ($I_{+f}$, $Q_{+f}$) and the negative frequency correlation values ($I_{-f}$, $Q_{-f}$) respectively.

$$I_{+fc} = \sum_{k=1}^{t} I_{+fk}$$

$$Q_{+fc} = \sum_{k=1}^{t} Q_{+fk}$$

$$I_{-fc} = \sum_{k=1}^{t} I_{-fk}$$

$$Q_{-fc} = \sum_{k=1}^{t} Q_{-fk}$$

The coprocessor 114 controls the period of programmable coherent integration based on signal sensitivity. The coherent integration values represent multiples of the N samples of the intermediate frequency (IF) data. For example, if the programmed duration of time for coherent integration is "t", then the coherent accumulator 108b accumulates the positive frequency correlation values and the negative frequency correlation values "t" times. Therefore, the total number of IF data samples that are coherently accumulated will be t*N samples of the IF data.

The non-coherent accumulator 108c is operably connected to the coherent accumulator 108b and receives the coherent integration values ($I_{+fc}$, $Q_{+fc}$, $I_{-fc}$, and $Q_{-fc}$) corresponding to the positive frequency and the negative frequency of the received N samples of the intermediate frequency (IF) data from the coherent accumulator 108*b*. The non-coherent accumulator 108*c* generates non-coherent integration values corresponding to the positive frequency and the negative frequency of the received N samples of the IF data by performing programmable non-coherent integration across the coherent integration values. As used herein, "programmable non-coherent integration" refers to detecting envelope values of the positive frequency coherent integration values and the negative frequency coherent integration values of the t*N samples of the IF data, and accumulating the envelope values over a predetermined duration of time programmed by the coprocessor 114.

In the above example, the coherent accumulator 108*b* transmits the generated coherent integration values a ($I_{+fc1}$, $Q_{+fc1}$, $I_{-fc1}$, and $Q_{-fc1}$) at time t0 and transmits the generated coherent integration values ($I_{+fc2}$, $Q_{+fc2}$, $I_{-fc2}$, and $Q_{-fc2}$) at time t1=t0+T, where T is a coherent integration period, to the non-coherent accumulator 108*c*. The non-coherent accumulator 108*c* then generates the non-coherent integration values, namely, ($V_{+f} = \sqrt{I_{+fc1}^2 + Q_{+fc1}^2} + \sqrt{I_{+fc2}^2 + Q_{+fc2}^2}$) and ($V_{-f} = \sqrt{I_{-fc1}^2 + Q_{-fc1}^2} + \sqrt{I_{-fc2}^2 + Q_{-fc2}^2}$) corresponding to the positive frequency and the negative frequency of the received N samples of the intermediate frequency (IF) data respectively, by performing programmable non-coherent integration across the coherent integration values over the two time intervals t0 and t1 of the coherent integration period. Similarly, the non-coherent accumulator 108*c* performs non-coherent integration over many coherent integration values. The non-coherent accumulator 108*c* performs non-coherent integration of the coherent integration values sequentially generated and transmitted by the coherent accumulator 108*b*. The peak detector 109 operably connected to the non-coherent accumulator 108*c* of the post correlation unit 108 performs acquisition checks on the generated non-coherent integration values that correspond to the positive frequency and the negative frequency of the received N samples of the IF data against a predefined threshold value or a dynamically computed threshold value. If the non-coherent integration values exceed the threshold value, then the global navigation satellite system (GNSS) signal is declared to be acquired. Otherwise, the GNSS signal is not acquired.

The global navigation satellite system (GNSS) receiver 100 comprising the sequential chip mixed frequency correlator array system (SCMFCAS) 106 disclosed herein provides an improvement in satellite receiver technology as follows: On implementing the GNSS receiver 100 disclosed herein using the GNSS baseband engine 102 employing the SCMFCAS 106, each of the M mixed frequency correlators 125 of the SCMFCAS 106 computes the accumulated correlation components for a positive frequency and a negative frequency of a single GNSS signal. The time multiplexed final stage adders and subtractors 108*a* compute the correlation values of the positive frequency and the negative frequency of the single GNSS signal by combining the accumulated correlation components. The number of the mixed frequency correlators 125 required by the SCMFCAS 106 is less compared to a conventional, standard correlator. This reduction in the number of the mixed frequency correlators 125 in the SCMFCAS 106 and the reduction in bit width disclosed above reduce the logic area of the SCMFCAS 106, thereby reducing the power consumption of the GNSS baseband engine 102 and thus reducing the power consumption of the GNSS receiver 100. The SCMFCAS 106 further achieves the same time to first fix as compared to the conventional, standard correlator with a small number of correlators. Furthermore, each of the P signal generators 115, 123, and 124 of the SCMFCAS 106 disclosed herein is implemented with a single local carrier generator 117 and a single pseudo random noise code generator 120 corresponding to either a positive frequency or a negative frequency of the received N samples of the intermediate frequency (IF) data to obtain the correlation values that correspond to the positive frequency and the negative frequency of the received N samples of the IF data.

Figure 4:
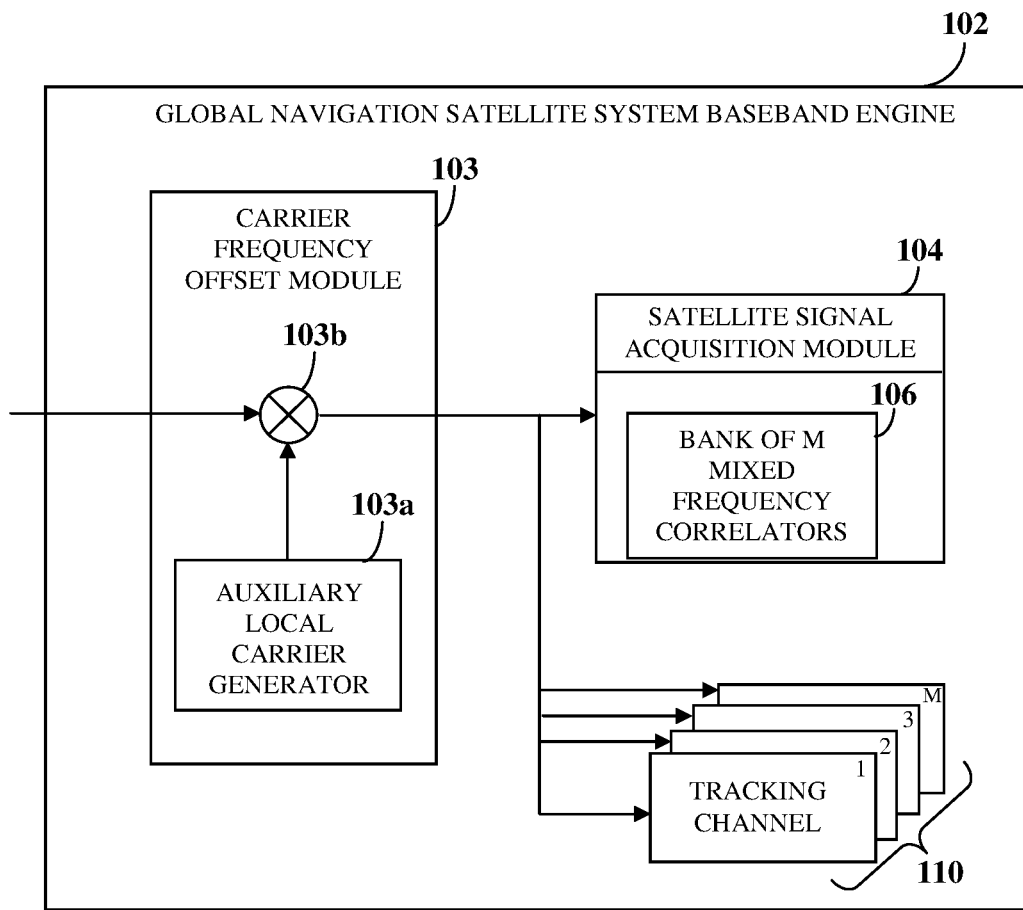
FIG. 4 exemplarily illustrates an embodiment, showing a carrier frequency offset module deployed in the global navigation satellite system baseband engine for offsetting carrier frequency of N samples of intermediate frequency data.

FIG. 4 exemplarily illustrates an embodiment, showing the carrier frequency offset module 103 deployed in the global navigation satellite system (GNSS) baseband engine 102 for offsetting carrier frequency of N samples of intermediate frequency (IF) data. The carrier frequency offset module 103 is operably connected to the radio frequency down converter 101 and the sequential chip mixed frequency correlator array system (SCMFCAS) 106 in the GNSS baseband engine 102 as exemplarily illustrated in FIG. 1. The SCMFCAS 106 is exemplarily represented as a bank of M mixed frequency correlators in FIG. 4. In addition to the power reduction achieved by using the SCMFCAS 106 in the satellite signal acquisition module 104 exemplarily illustrated in FIG. 1, the implementation of the carrier frequency offset module 103 further reduces the power consumption during generation of the carrier reference signal. This implementation is also applicable to the tracking module 110 comprising tracking channels as exemplarily illustrated in FIG. 4.

The carrier frequency offset module 103 comprises an auxiliary local carrier generator 103*a* and an auxiliary mixer 103*b*. The auxiliary local carrier generator 103*a* is common to the satellite signal acquisition module 104, and therefore common to all the M mixed frequency correlators 125 of the sequential chip mixed frequency correlator array system (SCMFCAS) 106 exemplarily illustrated in FIG. 2. The auxiliary local carrier generator 103*a* generates an offsetting carrier reference signal. As used herein, "offsetting carrier reference signal" refers to a negative intermediate frequency (IF) signal used to offset carrier frequency of the N samples of the IF data received from the radio frequency (RF) down converter 101 of the GNSS receiver 100 exemplarily illustrated in FIG. 1. The auxiliary local carrier generator 103*a* operates at a sampling rate $f_s$ to offset the carrier frequency of the N samples of the IF data to zero. The auxiliary mixer 103*b* is a complex mixer operably connected to the auxiliary local carrier generator 103*a* and the RF down converter 101 for offsetting the carrier frequency of the N samples of the IF data to zero by mixing the N samples of the IF data with the offsetting carrier reference signal, for further reducing the power consumption of the GNSS receiver 100.

The carrier frequency offset module 103 brings the carrier frequency of the N samples of the intermediate frequency (IF) data to zero or near zero by mixing the N samples of the IF data with the offsetting carrier reference signal having a frequency equal to the IF locally generated by the auxiliary local carrier generator 103*a*, before passing the N samples of the IF data to the satellite signal acquisition module 104 and the tracking module 110 in the global navigation satellite system (GNSS) baseband engine 102. In this implementation, the single local carrier generator 117 in each of the P signal generators 115, 123, and 124 of the sequential chip mixed frequency correlator array system (SCMFCAS) 106 exemplarily illustrated in FIG. 2, operates at a frequency greater than twice the maximum Doppler frequency supported by the GNSS receiver 100, thereby precluding operation of the single local carrier generator 117 at the sampling rate $f_s$ within the SCMFCAS 106, and further reducing the power consumption of the GNSS receiver 100. The frequency of operation of the single local carrier generator 117 is selected using a Nyquist criterion. The Nyquist criterion is a standard for signal sampling and generation employed in GNSS receivers.

In an example, for commercial applications, the maximum Doppler frequency is typically less than 10 KHz. By using the Nyquist criterion, it is sufficient if the single local carrier generator 117 operates at frequencies slightly greater than 20 KHz, for example, at the numerically controlled oscillator frequency ($f_{NCO}$). Therefore, the single local carrier generator 117 does not need to run at the sampling rate within the sequential chip mixed frequency correlator array system (SCMFCAS) 106 or the tracking channels. Operating the local carrier generator 117 of each of the P signal generators 115, 123, and 124 at the frequency $f_{NCO}$ that is lower than the sampling rate $f_s$ of the N samples of the intermediate frequency (IF) data reduces the power consumption of the SCMFCAS 106 by a factor of $f_s/f_{NCO}$. For example, operating the single local carrier generator 117 of each of the P signal generators 115, 123, and 124 at the frequency $f_{NCO}$ reduces the power consumption of the SCMFCAS 106 by a factor of ($P*f_s/f_{NCO}$) compared to operating the local carrier generators 117 at $f_s$. For example, if the sampling frequency is 16 MHz and $f_{NCO}$ is 40 KHz, then the operating power or power consumed by the single local carrier generator 117 is reduced by a significant factor of 16 MHz/40 KHz=400. This implementation therefore generates the carrier reference signal by running the single local carrier generator 117 at frequencies less than that of the IF sampling frequency, that is, slightly above the Nyquist sampling frequency to save power. In this implementation, the cost of running the single local carrier generators 117 of all the P signal generators 115, 123, and 124 of the SCMFCAS 106 at $f_{NCO}$ is less than or the same as the cost of running one single local carrier generator 117 at $f_s$.

The power consumed by a logic circuit of the single local carrier generator 117 is given by the expression $P=C*V^2*p*f$, where "P" indicates dynamic power, "C" indicates load capacitance, "p" indicates probability of an output transition, and "f" indicates operating frequency. The expression $P=C*V^2*p*f$ illustrates that the dynamic power is proportional to the frequency of operation. Thus, reducing the frequency of operation of the P signal generators 115, 123, and 124 reduces the dynamic power of the sequential chip mixed frequency correlator array system (SCMFCAS) 106, thereby reducing the power consumption of the global navigation satellite system (GNSS) receiver 100.

Figure 5:
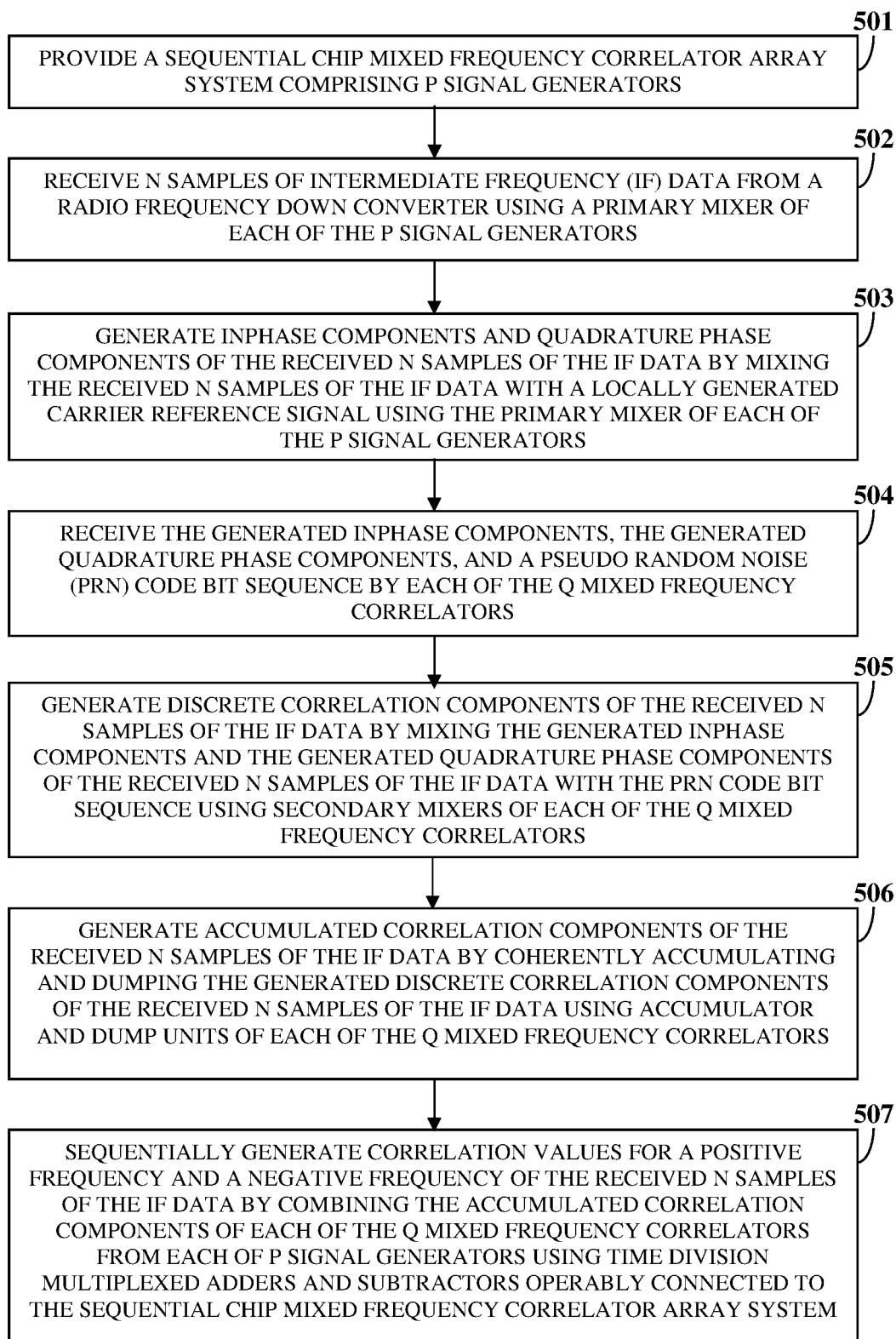
FIG. 5 illustrates a method for generating correlation values for a positive frequency and a negative frequency of a single global navigation satellite system signal received by a radio frequency down converter of the global navigation satellite system receiver.

FIG. 5 illustrates a method for generating correlation values for a positive frequency and a negative frequency of a single global navigation satellite system (GNSS) signal received by the radio frequency (RF) down converter 101 of the GNSS receiver 100 exemplarily illustrated in FIG. 1. In the method disclosed herein, the sequential chip mixed frequency correlator array system (SCMFCAS) 106 comprising P signal generators 115, 123, and 124 deployed in the GNSS baseband engine 102 exemplarily illustrated in FIGS. 1-2, is provided 501. Each of the P signal generators 115, 123, and 124 comprises the single local carrier generator 117, the primary mixer 116, the single pseudo random noise (PRN) code generator 120, the linear feedback shift register (LFSR) 121 operably connected to the single PRN code generator 120, and Q mixed frequency correlators 122a, 122b, . . . , to 122q operably connected to the primary mixer 116 and the LFSR 121 as exemplarily illustrated in FIGS. 2-3. The components of each of the P signal generators 115, 123, and 124 of the SCMFCAS 106 function as follows: The primary mixer 116 receives 502 N samples of intermediate frequency (IF) data corresponding to the GNSS signal from the RF down converter 101 as disclosed in the detailed description of FIG. 2. The primary mixer 116 generates 503 inphase components and quadrature phase components of the received N samples of the IF data by mixing the received N samples of the IF data with a carrier reference signal locally generated by the single local carrier generator 117. Each of the Q mixed frequency correlators 122a, 122b, . . . , to 122q receives 504 the generated inphase components, the generated quadrature phase components, and a PRN code bit sequence corresponding to the GNSS signal, generated by the single PRN code generator 120.

Each of the Q mixed frequency correlators 122a, 122b, . . . , to 122q comprises secondary mixers 127a, 127b, 127c, and 127d operably connected to the primary mixer 116, and accumulator and dump units 128a, 128b, 128c, and 128d operably connected to the corresponding secondary mixers 127a, 127b, 127c, and 127d respectively, as exemplarily illustrated in FIG. 3. The secondary mixers 127a, 127b, 127c, and 127d generate 505 discrete correlation components of the received N samples of the intermediate frequency (IF) data by mixing the generated inphase components and the generated quadrature phase components of the received N samples of the IF data with the pseudo random noise (PRN) code bit sequence. The accumulator and dump units 128a, 128b, 128c, and 128d generate 506 accumulated correlation components of the received N samples of the IF data by coherently accumulating and dumping the generated discrete correlation components of the received N samples of the IF data. The time division multiplexed adders and subtractors 108a operably connected to the sequential chip mixed frequency correlator array system (SCMFCAS) 106 exemplarily illustrated in FIGS. 2-3, sequentially generate 507 correlation values for a positive frequency and a negative frequency of the received N samples of the IF data by combining the accumulated correlation components of each of the Q mixed frequency correlators 122a, 122b, . . . , to 122q from each of the P signal generators 115, 123, and 124. Time division multiplexing of the final stage adders and subtractors 108a after the accumulation and the dumping of the generated discrete correlation components of the received N samples of the IF data, and the generation of the correlation values for the positive frequency and the negative frequency of the received N samples of the IF data using the accumulated correlation components of each of the Q mixed frequency correlators 122a, 122b, . . . , to 122q from each of the P signal generators 115, 123, and 124 reduce the logic area of the SCMFCAS 106 in the global navigation satellite system (GNSS) baseband engine 102, thereby reducing power consumption of the GNSS receiver 100.

In an embodiment, the carrier frequency offset module 103 operably connected to the radio frequency down converter 101 and the sequential chip mixed frequency correlator array system (SCMFCAS) 106 exemplarily illustrated in FIG. 1 and FIG. 4, and operating at a sampling rate, offsets the carrier frequency of the N samples of the intermediate frequency (IF) data to zero by mixing the N samples of the IF data with an offsetting carrier reference signal for further reducing the power consumption of the global navigation satellite system (GNSS) receiver 100 as disclosed in the detailed description of FIG. 4. Post correlation functions comprising coherent integration performed by the coherent accumulator 108b and non-coherent integration performed by the non-coherent accumulator 108c exemplarily illustrated in FIGS. 1-3, and acquisition checks performed by the peak detector 109 exemplarily illustrated in FIG. 2, are disclosed in the detailed description of FIGS. 2-3. The method disclosed herein is applicable to all the global navigation satellite system (GNSS) constellations and also applicable to all GNSS receivers.

Figure 6:
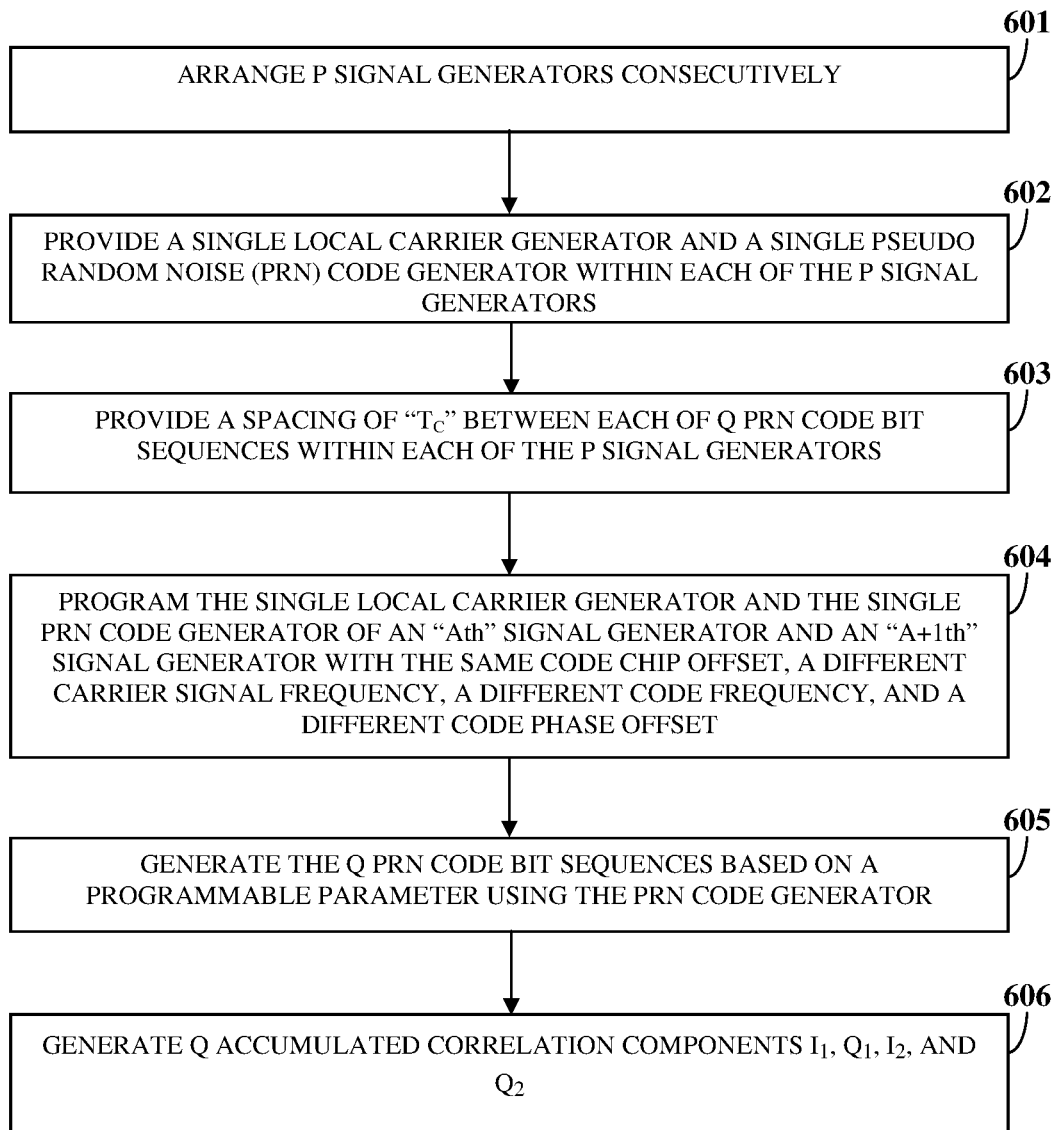
FIG. 6 exemplarily illustrates a method for setting up the sequential chip mixed frequency correlator array system for generating accumulated correlation components of N samples of intermediate frequency data.

FIG. 6 exemplarily illustrates a method for setting up the sequential chip mixed frequency correlator array system (SCMFCAS) 106 exemplarily illustrated in FIG. 2, for generating accumulated correlation components of N samples of intermediate frequency (IF) data. In the method disclosed herein, P signal generators 115, 123, and 124 are arranged 601 consecutively in the SCMFCAS 106 as exemplarily illustrated in FIG. 2. A single local carrier generator 117 and a single pseudo random noise code (PRN) generator 120 exemplarily illustrated in FIGS. 2-3, are provided 602 within each of the P signal generators 115, 123, and 124. A spacing of "$T_c$" is provided 603 between each of Q PRN code bit sequences within each of the P signal generators 115, 123, and 124. As used herein, "$T_a$" refers to spacing between adjacent mixed frequency correlators, for example, 122a, 122b, . . . , to 122q of each of the P signal generators 115, 123, and 124 exemplarily illustrated in FIG. 2, that search different PRN code bits. For example, $T_c$ is 0.5 chips, that is, half of one code bit period, for global positioning system (GPS) L1 coarse/acquisition (C/A) signals.

The single local carrier generator 117 and the single pseudo random noise code (PRN) code generator 120 exemplarily illustrated in FIG. 2, of an "$A^{th}$" signal generator and an "$A+1^{th}$" signal generator are programmed 604 with the same code chip offset, a different carrier signal frequency, a different code frequency, and a different code phase offset. For example, the mixed frequency correlators, for example, 122a, 122b, . . . , to 122q of each of the P signal generators 115, 123, and 124 are programmed to search different code phases of the same code chip offset. The ability to program the code phase offset allows the programmability of the chip spacing $T_c$. The mixed frequency correlators, for example, 122a, 122b, . . . , to 122q of each of the P signal generators 115, 123, and 124 are programmed to search for any code phase and code chip with any code frequency, and carrier with any frequency. Q PRN code bit sequences are generated 605 based on a programmable parameter, for example, a programmed code phase offset, a code chip offset, and a code frequency using the single PRN code generator 120. Q accumulated correlation components $I_1$, $Q_1$, $I_2$, and $Q_2$ are then generated 606 as disclosed in the detailed description of FIG. 3.

Figure 7A:
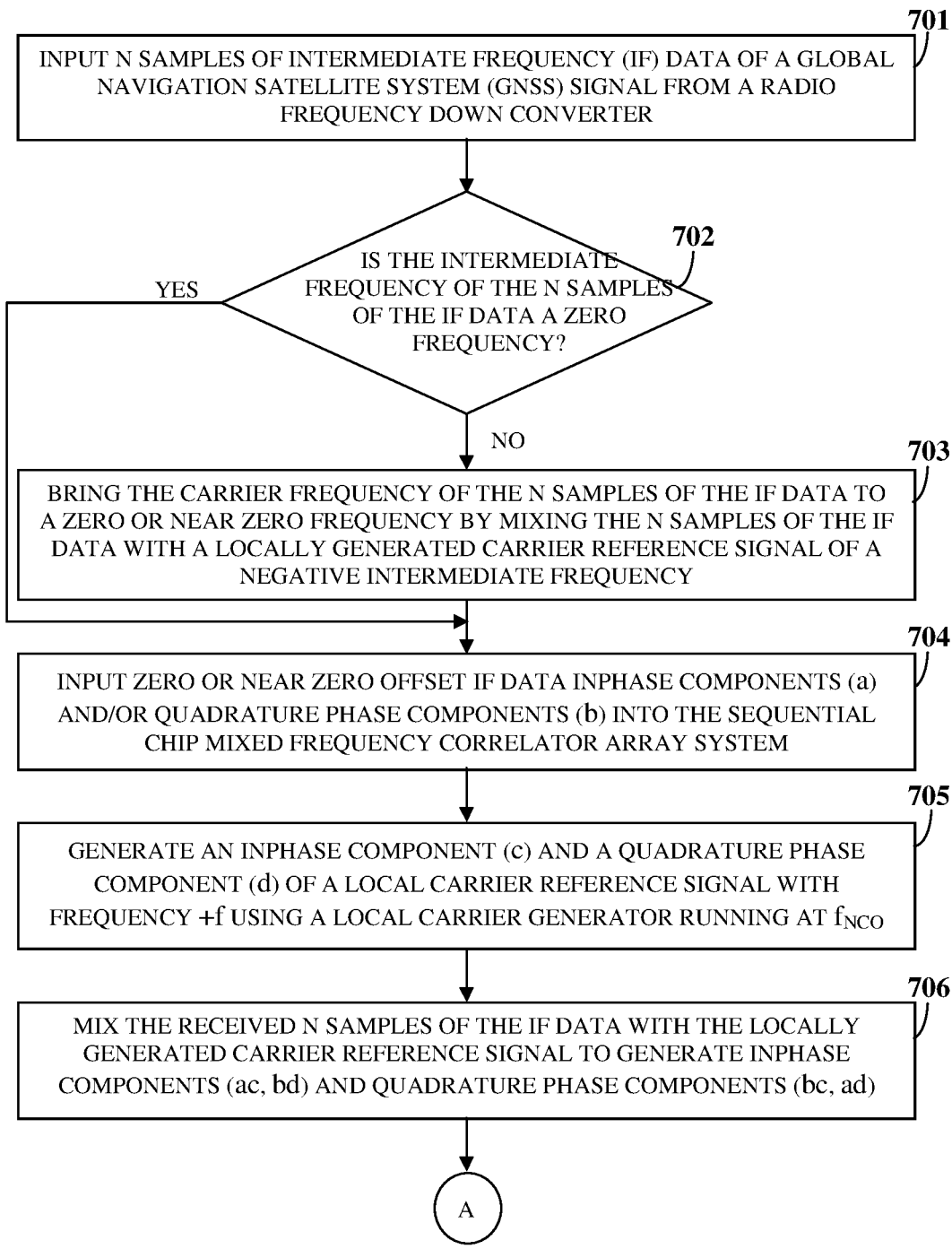
FIGS. 7A-7B exemplarily illustrate a flowchart comprising the steps for generating correlation values for a positive frequency and a negative frequency of a single global navigation satellite system signal.
Figure 7B:
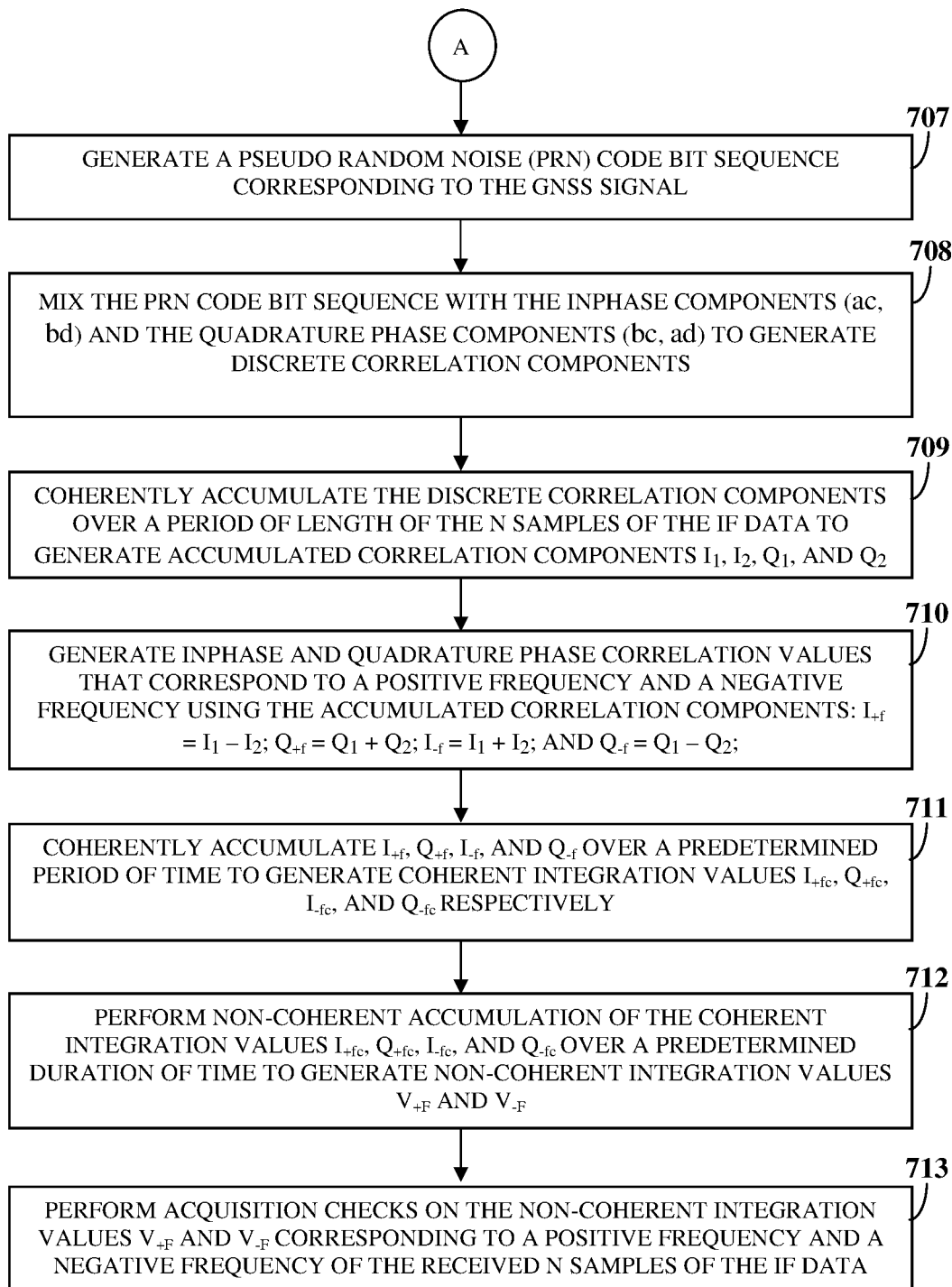

FIGS. 7A-7B exemplarily illustrate a flowchart comprising the steps for generating correlation values for a positive frequency and a negative frequency of a single global navigation satellite system (GNSS) signal. The radio frequency down converter 101 of the GNSS receiver 100 exemplarily illustrated in FIG. 1, inputs 701 N samples of intermediate frequency (IF) data of a GNSS signal into the GNSS baseband engine 102 exemplarily illustrated in FIG. 1. A check 702 of whether the intermediate frequency of the N samples of the IF data is a zero frequency is performed in the GNSS baseband engine 102. If the intermediate frequency of the N samples of the IF data is a non-zero frequency, the carrier frequency offset module 103 exemplarily illustrated in FIG. 1 and FIG. 4, brings 703 the carrier frequency of the N samples of the IF data to a zero or near zero frequency by mixing the N samples of the IF data with a locally generated carrier reference signal of a negative intermediate frequency. The carrier frequency offset module 103 inputs 704 the zero or near zero offset IF data inphase components (a) and/or quadrature phase components (b) into the sequential chip mixed frequency correlator array system (SCMFCAS) 106 via the carrier generator and mixer 105 exemplarily illustrated in FIGS. 1-2.

In each of the P signal generators 115, 123, and 124 of the sequential chip mixed frequency correlator array system (SCMFCAS) 106 exemplarily illustrated in FIG. 2, the local carrier generator 117, that is, a numerically controlled oscillator (NCO) running at $f_{NCO}$, generates 705 an inphase component (c) and an quadrature phase component (d) of a local carrier reference signal with a frequency +f; the primary mixer 116 mixes 706 the received N samples of the intermediate frequency (IF) data with the locally generated carrier reference signal to generate inphase components (ac, bd) and quadrature phase components (bc, ad); the pseudo random noise (PRN) code generator 120 generates 707 a pseudo random noise (PRN) code bit sequence corresponding to the global navigation satellite system (GNSS) signal; and each of the Q mixed frequency correlators, for example, 122a, 122b, . . . , to 122q mixes 708 the PRN code bit sequence with the inphase components (ac, bd) and the quadrature phase components (bc, ad) to generate discrete correlation components and coherently accumulates 709 the discrete correlation components over a period of length of the N samples of the IF data to generate accumulated correlation components $I_1$, $I_2$, $Q_1$, and $Q_2$.

The final stage adders and subtractors 108a of the global navigation satellite system (GNSS) baseband engine 102 exemplarily illustrated in FIG. 2, generate 710 inphase and quadrature phase correlation values that correspond to a positive frequency and a negative frequency, that is, $I_{+f}=I_1-I_2$; $Q_{+f}=Q_1+Q_2$; $I_{-f}=I_1+I_2$; and $Q_{-f}=Q_1-Q_2$, using the accumulated correlation components $I_1$, $I_2$, $Q_1$, and $Q_2$; the coherent accumulator 108b coherently accumulates 711 $I_{+f}$, $Q_{+f}$, $I_{-f}$ and $Q_{-f}$ over a predetermined period of time to generate coherent integration values $I_{+fc}$, $Q_{+fc}$, $I_{-fc}$, and $Q_{-fc}$ respectively; the non-coherent accumulator 108c performs non-coherent accumulation 712 of the coherent integration values $I_{+fc}$, $Q_{+fc}$, $I_{-fc}$, and $Q_{-fc}$ over a predetermined duration of time to generate non-coherent integration values $V_{+F}$ and $V_{-F}$; and the peak detector 109 performs acquisition checks 713 on the non-coherent integration values $V_{+F}$ and $V_{-F}$ corresponding to the positive frequency and the negative frequency of the received N samples of the intermediate frequency (IF) data as disclosed in detailed description of FIG. 3. In the method disclosed herein, an acquisition search comprising a search for a particular frequency and a pseudo random noise (PRN) code delay is completed over two frequency bins +f and −f by locally generating a carrier with only one frequency. The method disclosed herein saves power by operating the single local carrier generator 117 at $f_{NCO}$. Each of the M mixed frequency correlators 125 of the sequential chip mixed frequency correlator array system (SCMFCAS) 106 obtains the correlation values that correspond to two frequency bins instead of having two separate correlators.

FIG. 8 exemplarily illustrates a comparison table representing bit widths for parameters at different stages of correlation in a standard correlator and in one of the M mixed frequency correlators 125 of the sequential chip mixed frequency correlator array system (SCMFCAS) 106 exemplarily illustrated in FIG. 2. Consider an example where an intermediate frequency (IF) data input (a, b) having a bit width of two bits each, is mixed with a locally generated carrier reference signal (c, d) having a bit width of two bits each. A primary mixer in the standard correlator generates inphase components (ac, bd) and quadrature phase components (ad, bc) of 4 bits each. The primary mixer 116 in the signal generator 115 exemplarily illustrated in FIGS. 2-3, generates inphase components (ac, bd) and quadrature phase components (bc, ad) of 4 bits each. An adder and a subtractor in the primary mixer of the standard correlator generate an inphase component (ac-bd) and a quadrature phase component (ad+bc) of 5 bits each. Secondary mixers operably connected to the primary mixer of the standard correlator generate an inphase correlation component and a quadrature phase correlation component of a bit width of 5 bits each by mixing the inphase component (ac−bd) and the quadrature phase component (ad+bc) with a pseudo random noise (PRN) code bit sequence generated by a PRN code generator. An accumulator and dump unit operably connected to the secondary mixers in the standard correlator generates correlation values $I_f$ and $Q_f$ having a bit width of 5 bits+log 2(N) by accumulating N generated inphase correlation components and the generated quadrature phase correlation components output of the secondary mixers of the standard correlator, where N corresponds to the N samples of the input IF data.

The secondary mixers 127a, 127b, 127c, and 127d of the mixed frequency correlator 122a exemplarily illustrated in FIG. 3, generate inphase discrete correlation components and quadrature phase discrete correlation components of 4 bits each by mixing the inphase components (ac, bd) and the quadrature phase components (bc, ad) with the pseudo random noise (PRN) code bit sequence generated by the single PRN code generator 120 exemplarily illustrated in FIG. 3. The accumulator and dump units 128a, 128b, 128c, and 128d of the mixed frequency correlator 122a exemplarily illustrated in FIG. 3, generate inphase accumulated correlation components ($I_1$, $I_2$) and quadrature phase accumulated correlation components ($Q_1$, $Q_2$) having a bit width of 4 bits+log 2(N) each by coherently accumulating the output generated by the secondary mixers 127a, 127b, 127c, and 127d. The time multiplexed final stage adders and subtractors 108a of the post correlation unit 108 exemplarily illustrated in FIG. 3, generate correlation values $I_{+f}$ and $Q_{+f}$ having a bit width of 5 bits+log 2(N) for a positive frequency and correlation values $I_{-f}$ and $Q_{-f}$ having a bit width of 5 bits+log 2(N) bits for a negative frequency, where N corresponds to the N samples of the input IF data.

The outputs generated by the secondary mixers 127a, 127b, 127c, and 127d and the accumulator and dump units 128a, 128b, 128c, and 128d corresponding to the mixed frequency correlator 122a are one bit less compared to the standard correlator. This reduction in bit width of the output of the secondary mixers 127a, 127b, 127c, and 127d of the mixed frequency correlator 122a reduces the number of mixed frequency correlators 125 required by the sequential chip mixed frequency correlator array system (SCMFCAS) 106 to generate correlation values of the positive frequency and the negative frequency by 50% compared to the number of correlators required in the standard correlator to generate the correlation values of the positive frequency and the negative frequency of the N samples of the IF data. This reduction in the number of the mixed frequency correlators 125 in the SCMFCAS 106 considerably reduces the logic area and the power consumed by the global navigation satellite system (GNSS) baseband engine 102, thereby reducing the power consumption of the GNSS receiver 100 exemplarily illustrated in FIG. 1, as disclosed in the detailed description of FIG. 3.

FIG. 9 exemplarily illustrates a comparison table representing resource comparison between two standard correlators and one of the M mixed frequency correlators 125, for example, the mixed frequency correlator 122a of the signal generator 115 of the sequential chip mixed frequency correlator array system (SCMFCAS) 106 exemplarily illustrated in FIGS. 2-3. The comparison table exemplarily illustrated in FIG. 9, shows that number of components, for example, the primary mixer 116, the single local carrier generator 117, the code numerically controlled oscillator (NCO) 119, and the single pseudo random noise (PRN) code generator 120 used by the mixed frequency correlator 122a exemplarily illustrated in FIGS. 2-3, is equal to half the number of components used by the two standard correlators with respect to carrier generation, carrier mixing, and PRN code bit sequence generation. The mixed frequency correlator 122a does not use an adder and a subtractor within the primary mixer 116 as compared to the standard correlators. Absence of the adder and the subtractor in the primary mixer 116 significantly saves logic area and power consumption of the mixed frequency correlator 122a of the SCMFCAS 106, thereby reducing the power consumption of the global navigation satellite system (GNSS) receiver 100 exemplarily illustrated in FIG. 1. While the number of secondary mixers 127a, 127b, 127c, and 127d and the accumulator and dump units 128a, 128b, 128c, and 128d of the mixed frequency correlator 122a exemplarily illustrated in FIG. 3, is the same as those of the standard correlators, the outputs generated by the accumulator and dump units 128a, 128b, 128c, and 128d of the mixed frequency correlator 122a are one bit less compared to the standard correlators.

The global navigation satellite system (GNSS) receiver 100 requires four additional final stage adders and subtractors 108a exemplarily illustrated in FIGS. 2-3, for generating the correlation values of the N samples of intermediate frequency (IF) data. The additional final stage adders and subtractors 108a increase the logic area and the power consumption of the GNSS receiver 100. The increase in the power consumption due to the additional final stage adders and subtractors 108a will not be significant because the additional final stage adders and subtractors 108a operate once for every output of the accumulator and dump units 128a, 128b, 128c, and 128d that is generated after adding N samples of the IF data which are sampled at $f_s$. Thus, the final stage adders and subtractors 108a operate at $f_s/N$ rate as compared to the rest of the components of the GNSS receiver 100 that operate at $f_s$, where N corresponds to the N samples of the input IF data. To reduce the effect of the increased logic area, these additional final stage adders and subtractors 108a are time multiplexed across the M mixed frequency correlators 125 of the sequential chip mixed frequency correlator array system (SCMFCAS) 106. The increase in the power consumption due to the addition of the four final stage adders and subtractors 108a is negligible as the inputs to the time multiplexed final stage adders and subtractors 108a arrive at a rate of $f_s/N$. The logic area contributed by the additional time multiplexed final stage adders and subtractors 108a to each of the M mixed frequency correlators 125 of the SCMFCAS 106 in the GNSS receiver 100 is equal to the area of 4/N adders and subtractors. For example, in a typical GNSS receiver, N is equal to the number of samples within 1 millisecond (ms). If the sampling frequency $f_s$ is, for example, 16 MHz, then N=16 MHz*1 ms=16000. Therefore, increase in the logic area per mixed frequency correlator 125 of the SCMFCAS 106 will be equal to the area of (4/16000) adders and subtractors, which is insignificant and can be neglected.

The foregoing examples have been provided merely for the purpose of explanation and are in no way to be construed as limiting of the method and the sequential chip mixed frequency correlator array system (SCMFCAS) 106 deployed in the global navigation satellite system (GNSS) receiver 100 exemplarily illustrated in FIGS. 1-3, disclosed herein. While the GNSS receiver 100 and the method have been described with reference to various embodiments, it is understood that the words, which have been used herein, are words of description and illustration, rather than words of limitation. Furthermore, although the GNSS receiver 100 and the method have been described herein with reference to particular means, materials, and embodiments, the GNSS receiver 100 and the method are not intended to be limited to the particulars disclosed herein; rather, the GNSS receiver 100 and the method extend to all functionally equivalent structures, methods and uses, such as are within the scope of the appended claims. Those skilled in the art, having the benefit of the teachings of this specification, may effect numerous modifications thereto and changes may be made without departing from the scope and spirit of the GNSS receiver 100 and the method disclosed herein in their aspects.

We claim:

1. A global navigation satellite system receiver comprising:
a radio frequency (RF) down converter, a global navigation satellite system baseband engine, and a coprocessor;
said global navigation satellite system baseband engine comprising a carrier frequency offset module, a satellite signal acquisition module and a tracking module;
said satellite signal acquisition module comprising a carrier generator and mixer, a sequential chip mixed frequency correlator array system, a selector, a post correlation unit, and a peak detector;
said sequential chip mixed frequency correlator array system comprising P signal generators deployed within said satellite signal acquisition module, wherein P is a positive integer corresponding to number of signal generators, and wherein each of said P signal generators comprise:
a primary mixer for receiving N samples of intermediate frequency data from said radio frequency down converter and generate inphase components and quadrature phase components of said received N samples of said intermediate frequency data by mixing said received N samples of said intermediate frequency data with a carrier reference signal locally generated by a local carrier generator, wherein said N samples of said intermediate frequency data correspond to a global navigation satellite system signal received by said radio frequency down converter;
a pseudo random noise code generator for generating a pseudo random noise code bit sequence, said generated pseudo random noise code bit sequence corresponding to said received global navigation satellite system signal;
Q mixed frequency correlators operably connected to said primary mixer and to said pseudo random noise code generator via a linear feedback shift register, wherein Q is a positive integer corresponding to number of mixed frequency correlators, and wherein each of said Q mixed frequency correlators comprise:
secondary mixers operably connected to said primary mixer for generating discrete correlation components of said received N samples of said intermediate frequency data by mixing said generated inphase components and said generated quadrature phase components of said received N samples of said intermediate frequency data with said generated pseudo random noise code bit sequence; and
accumulator and dump units operably connected to corresponding said secondary mixers for generating accumulated correlation components of said received N samples of said intermediate frequency data by coherently accumulating and dumping said generated discrete correlation components of said received N samples of said intermediate frequency data; and
said post correlation unit comprising final stage adders and subtractors, a coherent accumulator, and a non-coherent accumulator;
said final stage adders and subtractors operably connected to said sequential chip mixed frequency correlator array system via said selector, wherein said final stage adders and subtractors are time division multiplexed for sequentially generating correlation values for a positive frequency and a negative frequency of said received N samples of said intermediate frequency data by combining said accumulated correlation components of said each of said Q mixed frequency correlators from said each of said P signal generators;
wherein time division multiplexing of said final stage adders and subtractors after said accumulation and said dumping of said generated discrete correlation components of said received N samples of said intermediate frequency data, and said generation of said correlation values for said positive frequency and said negative frequency of said received N samples of said intermediate frequency data using said accumulated correlation components of said each of said Q mixed frequency correlators from said each of said P signal generators reduce logic area of said sequential chip mixed frequency correlator array system in said global navigation satellite system baseband engine, thereby reducing power consumption of said global navigation satellite system receiver.

2. The global navigation satellite system receiver of claim 1, wherein said carrier frequency offset module is operably connected to said radio frequency down converter and said sequential chip mixed frequency correlator array system, said carrier frequency offset module comprising:
an auxiliary local carrier generator for generating an offsetting carrier reference signal, wherein said auxiliary local carrier generator operates at a sampling rate $f_s$; and
an auxiliary mixer operably connected to said auxiliary local carrier generator and said radio frequency down converter for offsetting carrier frequency of said N samples of said intermediate frequency data to zero by mixing said N samples of said intermediate frequency data with said offsetting carrier reference signal, for further reducing said power consumption of said global navigation satellite system receiver.

3. The global navigation satellite system receiver of claim 1, wherein said local carrier generator operates at a frequency greater than twice of maximum Doppler frequency supported by said global navigation satellite system receiver, thereby precluding operation of said local carrier generator at said sampling rate $f_s$ within said sequential chip mixed frequency correlator array system, and further reducing said power consumption of said global navigation satellite system receiver.

4. The global navigation satellite system receiver of claim 3, wherein said frequency of operation of said local carrier generator is selected using a Nyquist criterion.

5. The global navigation satellite system receiver of claim 1, wherein:
- said coherent accumulator operably connected to said final stage adders and subtractors for performing coherent integration of said generated correlation values corresponding to said positive frequency and said negative frequency of said received N samples of said intermediate frequency data over a predetermined duration of time to generate coherent integration values corresponding to said positive frequency and said negative frequency of said received N samples of said intermediate frequency data;
- said non-coherent accumulator operably connected to said coherent accumulator for performing non-coherent integration of said generated coherent integration values to generate non-coherent integration values corresponding to said positive frequency and said negative frequency of said received N samples of said intermediate frequency data; and
- said peak detector operably connected to said non-coherent accumulator for performing acquisition checks on said generated non-coherent integration values corresponding to said positive frequency and said negative frequency of said received N samples of said intermediate frequency data against a threshold value.

6. The global navigation satellite system receiver of claim 1, wherein said N samples of said intermediate frequency data comprise one of complex intermediate frequency data and real intermediate frequency data.

* * * * *